(12) United States Patent
Jones

(10) Patent No.: US 9,804,024 B2
(45) Date of Patent: Oct. 31, 2017

(54) LIGHT MEASUREMENT AND/OR CONTROL TRANSLATION FOR DAYLIGHTING

(71) Applicant: MoJo Labs, Inc., Longmont, CO (US)

(72) Inventor: Morgan Jones, Longmont, CO (US)

(73) Assignee: MOJO LABS, INC., Longmont, CO (US)

( * ) Notice: Subject to any disclaimer, the term of this patent is extended or adjusted under 35 U.S.C. 154(b) by 533 days.

(21) Appl. No.: 14/214,024

(22) Filed: Mar. 14, 2014

(65) Prior Publication Data

US 2014/0263977 A1 Sep. 18, 2014

Related U.S. Application Data

(60) Provisional application No. 61/865,494, filed on Aug. 13, 2013, provisional application No. 61/784,804, filed on Mar. 14, 2013, provisional application No. 61/784,731, filed on Mar. 14, 2013, provisional application No. 61/784,832, filed on Mar. 14, 2013, provisional application No. 61/784,867, filed on Mar. 14, 2013.

(51) Int. Cl.
*G01J 1/42* (2006.01)
*G01J 1/16* (2006.01)
*H05B 37/02* (2006.01)
*G01J 1/02* (2006.01)

(52) U.S. Cl.
CPC .......... *G01J 1/4204* (2013.01); *G01J 1/0228* (2013.01); *G01J 1/16* (2013.01); *H05B 37/0218* (2013.01); *G01J 2001/0257* (2013.01); *Y02B 20/40* (2013.01); *Y02B 20/46* (2013.01)

(58) Field of Classification Search
CPC .......... G01J 1/0228; G01J 1/16; G01J 1/4204; H05B 37/0218
USPC .................................... 250/214 AL
See application file for complete search history.

(56) References Cited

U.S. PATENT DOCUMENTS

| | | | |
|---|---|---|---|
| 5,701,058 A | * | 12/1997 | Roth .................. H05B 37/0218 250/214 D |
| 5,812,422 A | | 9/1998 | Lyons |
| 6,340,864 B1 | | 1/2002 | Wacyk |
| 6,741,351 B2 | | 5/2004 | Marshall et al. |
| 7,570,246 B2 | | 8/2009 | Maniam et al. |
| 7,583,901 B2 | | 9/2009 | Nakagawa et al. |
| 7,926,300 B2 | | 4/2011 | Roberts |
| 7,952,292 B2 | | 5/2011 | Vegter et al. |
| 8,305,014 B1 | | 11/2012 | Li et al. |

(Continued)

OTHER PUBLICATIONS

Notice of Allowance from U.S. Appl. No. 13/970,424, issued Mar. 17, 2014, 13 pgs.

(Continued)

*Primary Examiner* — Thanh Luu
*Assistant Examiner* — Kevin Wyatt

(57) ABSTRACT

Systems and methods are disclosed to translate a desired light level at a particular task location to a light level measured by a light sensor at a non-task location such as a wall location or a light switch location. For example, the light measured on the wall may be used to accomplish daylighting energy savings while maintaining a relatively constant illuminance value at the task location. Alternatively or additionally, up/down button presses at the wall location may be used to provide constant or consistent illuminance changes at the task location.

16 Claims, 30 Drawing Sheets

(56) References Cited

U.S. PATENT DOCUMENTS

| | | | |
|---|---|---|---|
| 8,330,395 B2 | 12/2012 | Hoschopf | |
| 8,410,706 B2 | 4/2013 | Steiner et al. | |
| 8,749,145 B2 | 6/2014 | Jones | |
| 8,749,146 B2 | 6/2014 | Jones | |
| 8,842,009 B2 | 9/2014 | Jones | |
| 9,288,882 B2 | 3/2016 | Jones | |
| 2004/0085901 A1 | 5/2004 | Hooper et al. | |
| 2005/0015122 A1* | 1/2005 | Mott | A61M 21/00 607/88 |
| 2006/0087841 A1 | 4/2006 | Chern et al. | |
| 2007/0058987 A1 | 3/2007 | Suzuki | |
| 2008/0203273 A1 | 8/2008 | Deurenberg | |
| 2008/0284348 A1* | 11/2008 | Cortenraad | H05B 37/02 315/291 |
| 2008/0309255 A1 | 12/2008 | Myers et al. | |
| 2008/0310850 A1 | 12/2008 | Pederson et al. | |
| 2009/0200958 A1 | 8/2009 | Doherty et al. | |
| 2009/0245806 A1 | 10/2009 | Murayama et al. | |
| 2009/0263132 A1 | 10/2009 | Rafel et al. | |
| 2010/0007600 A1 | 1/2010 | Deurenberg et al. | |
| 2010/0045191 A1* | 2/2010 | Aendekerk | G05D 25/02 315/152 |
| 2010/0188004 A1 | 7/2010 | Baggen et al. | |
| 2010/0244706 A1* | 9/2010 | Steiner | G01J 1/02 315/149 |
| 2010/0284690 A1 | 11/2010 | Rajagopal et al. | |
| 2010/0327757 A1 | 12/2010 | Chung et al. | |
| 2010/0327764 A1 | 12/2010 | Knapp | |
| 2011/0018465 A1 | 1/2011 | Ashdown | |
| 2011/0031897 A1 | 2/2011 | Henig et al. | |
| 2011/0084615 A1 | 4/2011 | Welten | |
| 2011/0115386 A1 | 5/2011 | Delnoij | |
| 2011/0156596 A1 | 6/2011 | Salsbury | |
| 2011/0199004 A1 | 8/2011 | Henig et al. | |
| 2012/0007511 A1 | 1/2012 | Choong et al. | |
| 2012/0086568 A1* | 4/2012 | Scott | G05B 15/02 340/501 |
| 2012/0091896 A1 | 4/2012 | Schenk et al. | |
| 2012/0091903 A1* | 4/2012 | Bembridge | F21S 6/005 315/178 |
| 2012/0153838 A1 | 6/2012 | Schenk et al. | |
| 2012/0200226 A1 | 8/2012 | Knibbe et al. | |
| 2012/0206050 A1* | 8/2012 | Spero | B60Q 1/04 315/152 |
| 2012/0217882 A1 | 8/2012 | Wong et al. | |
| 2012/0281879 A1 | 11/2012 | Vlutters et al. | |
| 2013/0069540 A1 | 3/2013 | Schenk et al. | |
| 2013/0140995 A1 | 6/2013 | Jones | |
| 2013/0328486 A1 | 12/2013 | Jones | |
| 2013/0334971 A1 | 12/2013 | Jones | |
| 2014/0263977 A1 | 9/2014 | Jones | |
| 2014/0292207 A1 | 10/2014 | Jones | |
| 2016/0014549 A1 | 1/2016 | Jones | |
| 2017/0171941 A1* | 6/2017 | Steiner | H05B 37/0218 |

OTHER PUBLICATIONS

Non-Final Office Action of U.S. Appl. No. 13/913,157, filed Mar. 3, 2014.
Non-Final Office Action of U.S. Appl. No. 13/310,911, filed Jun. 21, 2013.
Final Office Action of U.S. Appl. No. 13/310,911, filed Dec. 17, 2013.
Notice of Allowance of U.S. Appl. No. 13/310,911, filed Mar. 10, 2014.
Non-Final Office Action of 13/970,424, filed Dec. 13, 2013.

* cited by examiner

LIGHT MEASUREMENT AND/OR CONTROL TRANSLATION FOR DAYLIGHTING

CROSS-REFERENCE TO RELATED APPLICATIONS

This application claims priority to U.S. Provisional Application No. 61/865,494, filed Aug. 13, 2013, titled TASK TO WALL LIGHTING, which is incorporated herein by reference in their entireties.

This application claims priority to U.S. Provisional Application No. 61/784,804, filed Mar. 14, 2013, titled MULTIPLE SENSOR PROXIMITY DETERMINATION AND AUTO-ASSOCIATION, which is incorporated herein by reference in their entireties.

This application claims priority to U.S. Provisional Application No. 61/784,731, filed Mar. 14, 2013, titled SMART OCCUPANCY SENSORS which is incorporated herein by reference in their entireties.

This application claims priority to U.S. Provisional Application No. 61/784,832, filed Mar. 14, 2013, titled OPPORTUNISTIC ROUTING IN WIRELESS NETWORKS, which is incorporated herein by reference in their entireties.

This application claims priority to U.S. Provisional Application No. 61/784,867, filed Mar. 14, 2013, titled LIGHTING SYSTEM WITH DAYLIGHT HARVESTER AND PERSONAL CONTROL, which is incorporated herein by reference in their entireties.

BACKGROUND

The lighting controls industry uses the word "task" to indicate the point where the user cares about the light level. For example, the user is working at a desk; the task location is the light level at the desk. It could also be a kitchen counter, the light level at a book, or a conference table.

SUMMARY

Systems and methods are disclosed for task to wall lighting. A method is disclosed for measuring the ambient task light level. The method includes measuring a first ambient light level at a first location within an architectural space at a first time; measuring a second ambient light level at a second location within the architectural space at a time near the first time, wherein the first location is different than the second location; determining a non-task-to-task ambient translation from the first ambient light level and the second ambient light level; determining a third ambient light level at the second location at a second time, wherein the second time is different than the first time; and determining a fourth ambient light level at the first location at the second time from the second ambient light level and the non-task-to-task ambient translation.

In some embodiments the method for measuring the ambient task light level may include determining a third ambient light level at the second location at a second time further comprises measuring the third ambient light level at the second location at the second time. In some embodiments, the non-task-to-task ambient translation is the ratio of the first ambient light level at the first location and the second ambient light level at the second location.

In some embodiments, the determining a third ambient light level at the second location at a second time further comprises measuring a total light level at the second location; determining the light contribution of one or more light fixtures to the light level at the second location; and determining the third ambient light level from the total light level and the light contribution of the one or more light fixtures.

In some embodiments, a light sensor is provided that includes a photo sensor; a memory; and a controller coupled with the photo sensor and the memory. The controller may be configured to: measure a first ambient light level using the photo sensor at a task location within an architectural space at a first time; measure a second ambient light level using the photo sensor at a non-task location within the architectural space at a time near the first time, wherein the task location is different than the non-task location; determine a non-task-to-task ambient translation from the first ambient light level and the second ambient light level; store the non-task-to-task ambient translation in the memory; measure a total light level using the photo sensor at the non-task location within the architectural space at a second time, wherein the second time is different than the first time; determine a third ambient light level at the non-task location using the total light level; and determine a fourth ambient light level corresponding with the task location at the second time from the second ambient light level and the non-task-to-task ambient translation.

In some embodiments, the controller may be further configured to determine the light contribution of one or more light fixtures to the light level at the non-task location; and wherein the third ambient light level is determined from the total light level and the light contribution of the one or more light fixtures. In some embodiments the non-task-to-task ambient translation may be the ratio of the first ambient light level at the first location and the second ambient light level at the second location.

A method for determining the ambient light level at a task location is also provided. The method may include measuring a total light level at a non-task location; determining an ambient light level at the non-task location from the total light level at the non-task location; and determining an ambient light level at the task location from the ambient light level at the non-task location. In some embodiments, the ambient light level at the non-task location is determined using a non-task-to-task ambient translation. In some embodiments the ambient light level at the non-task location is determined using a ratio of a previously measured ambient light level at the task location and a previously measured ambient light level at the non-task location.

A method for determining a light adjustment value for a light source is also disclosed. The method may include measuring a total light level at a non-task location; determining an ambient light level at the non-task location from the total light level at the non-task location; determining an ambient light level at the task location from the ambient light level at the non-task location; and determining the light adjustment value from the desired light amount at the task location and the ambient light level at the task location. In some embodiments, the method may also include sending the light adjustment value to the light source.

In some embodiments, determining an ambient light level at the task location is determined from a non-task-to-task ambient translation. In some embodiments, determining an ambient light level at the task location is determined from a ratio of an ambient light level at the non-task location and an ambient light level at the task location. In some embodiments, determining the light adjustment value is determined from:

$$L_{adjustment} = L_{desired\ at\ task} - C \cdot A_{non\text{-}task},$$

where $L_{adjustment}$ is the light adjustment value, $L_{desired\ at\ task}$ is the desired light amount at the task location, C is the non-task-to-task ambient translation, and $A_{non-task}$ is the ambient light level at the non-task location.

The method may also include measuring a first ambient light level at the task location; and measuring a first ambient light level at the non-task location. And the determining an ambient light level at the task location may be determined from a ratio of the first ambient light level at the non-task location and the first ambient light level at the task location.

In some embodiments, a method is disclosed that includes measuring a first total light level at a non-task location; storing the first total light level in a memory; measuring a second total light level at the non-task location; storing the second total light level in the memory; and in the event the second total light level is different than the first total light level, determining a light adjustment value for a task location from the second total light level. In some embodiments, embodiments the light adjustment value may be determined from: $L_{adjustment} = E_{task,2} \cdot C \cdot \Delta L_{non-task,2}$, wherein $L_{adjustment}$ is the light adjustment value for the task location, $E_{task,2}$ is the light delivery efficiency of a light fixture at the task location, C is a non-task-to-task ambient translation, and $\Delta L_{non-task,2}$ is the difference between the first total light level and the second total light level.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to remotely control the light level at a task location without directly measuring the light level at the task location. By monitoring changes in light level at a non-task location such as, for example, a wall location, ceiling location, a top edge of a cubicle wall, a counter top, or other location within an architectural space, the light sensor may translate those light changes to a light adjustment value for a light fixture to maintain the desired or constant light level at the task location despite ambient light fluctuations.

Embodiments of the invention include systems and methods to translate a desired light level at a particular task location to a light level measured by a light sensor at a non-task location such as a wall location or a light switch location. For example, the light measured on the wall may be used to accomplish daylighting energy savings while maintaining a relatively constant illuminance value at the task location. Alternatively or additionally, up/down button presses at the wall location may be used to provide constant or consistent illuminance changes at the task location.

Embodiments of the invention include translating the estimation of the ambient light level (i.e., light from the sun or other non-controllable sources), and the estimation of the light delivery efficiencies from the wall location to the task location. A light sensor may measure the ambient light at both places (the wall location and the task location), and then can use that difference as a slope on a linear translation to translate ambient light changes at the wall location to ambient light changes at the task location.

Alternatively or additionally, the light sensor may measure light delivery efficiencies at the task location and/or at the wall location so that it can learn how commanded changes in the light level on the wall translate to changes in the light level at task, and how to dim the fixture light level to compensate for changes in ambient light (e.g., Daylighting).

In some embodiments, the non-task-to-task ambient translation information can be simply learned by the system during its normal operation, and not configured.

In some embodiments, the non-task-to-task ambient translation information can be used in various other systems that auto-associate light fixtures with the remote sensor using light bursts. It can also be used in a different system configuration where a light switch location in a home or office that is wired to directly control existing lights with a switch or dimmer is replaced by a digital dimmer that is a charging station for the remote sensor.

Figure 1A:
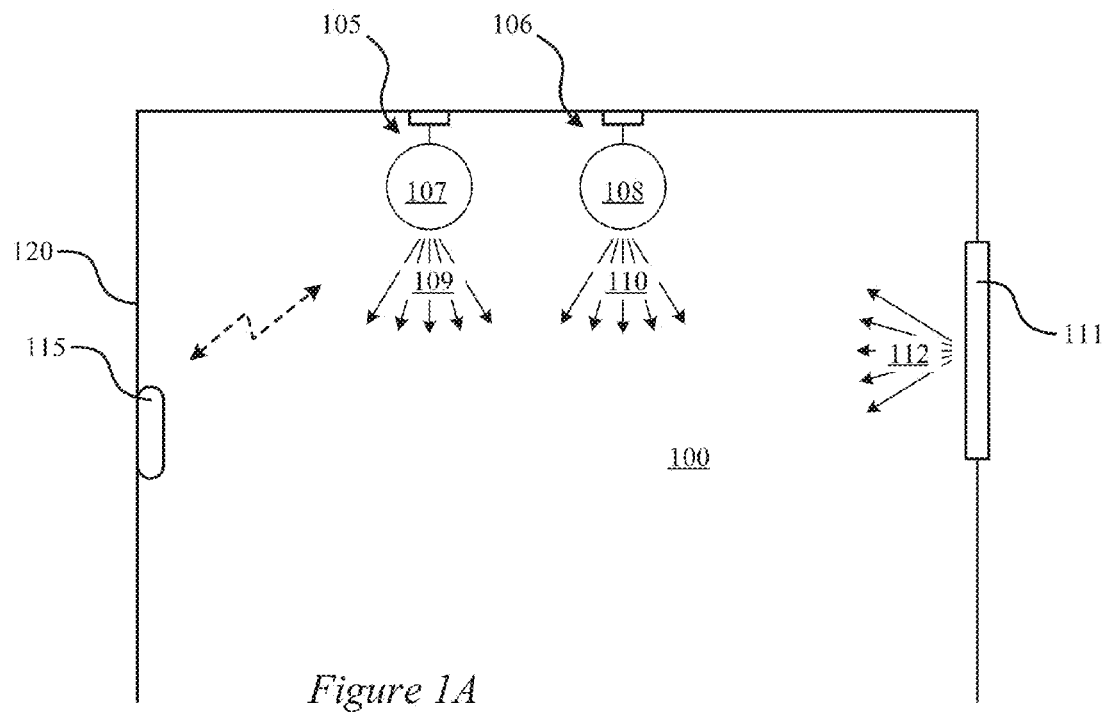
FIGS. 1A and 1B show an architectural space having a light fixture and/or a light fixture according to some embodiments described herein.
Figure 1B:
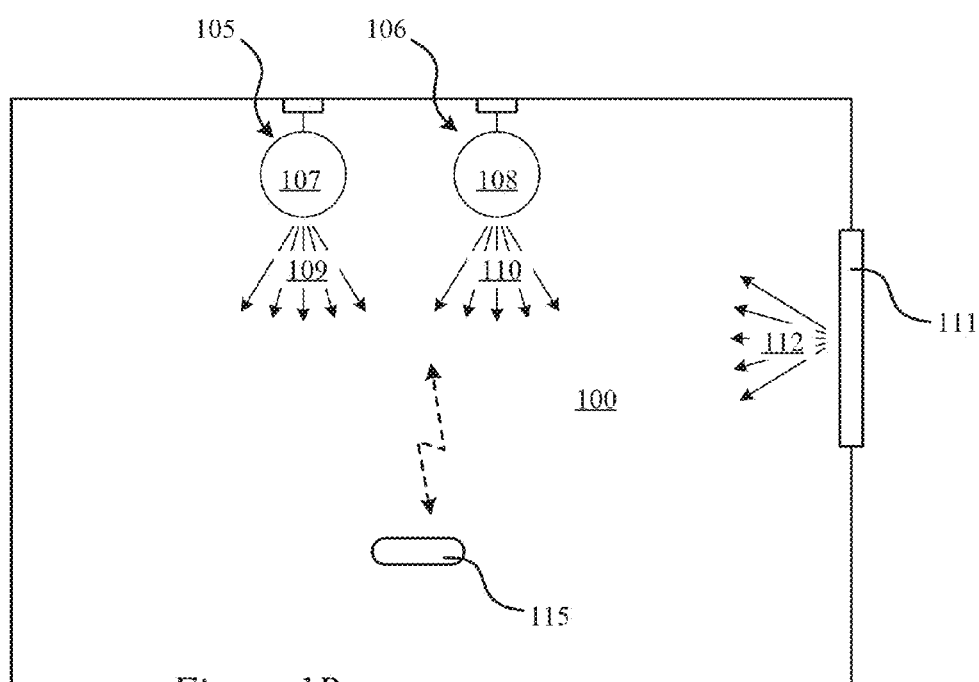
Figure 2:
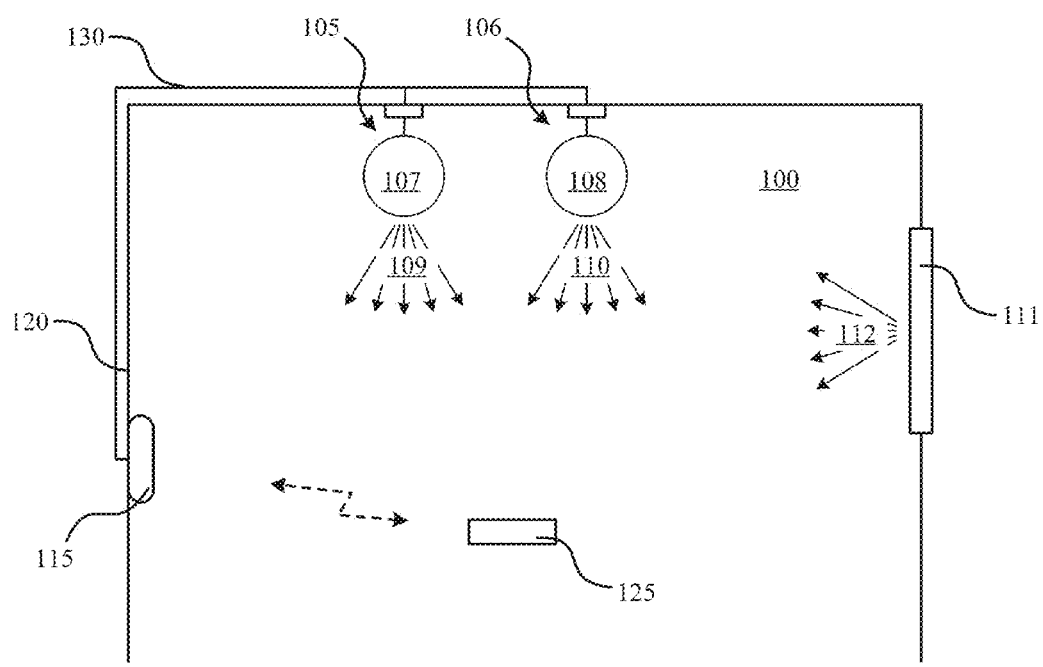
FIG. 2 shows a light sensor coupled with a wall according to some embodiments described herein.

FIGS. 1A and 1B show a side view of an architectural space 100 having a light fixture 105 and/or a light fixture 106. While two light fixtures are shown, any number may be positioned in the architectural space 100. The light fixture 105 includes a light source 107 that produces light 109. The light fixture 106 includes the light source 108 that produces light 110 that illuminates the architectural space 100. The light fixture 105 and/or the light fixture 106 may be secured to a wall 120 or ceiling and/or may be lamps that are positioned on a floor or a table. The light fixture 105 and/or the light fixture 106 may produce light from light-emitting diodes (LEDs), incandescent lights, or other light sources. The light fixture 105 and/or the light fixture 106 may include a number of components as shown in FIG. 2.

A light sensor 115 may also located within the architectural space 100. The light sensor 115 may be any device that can detect lux (the luminous flux per unit area) of light in the architectural space 100. The light sensor 115 may be portable and may be positioned at any location within the architectural space 100. For instance, FIG. 1A shows the light sensor 115 attached to the wall 120; and FIG. 1B shows the light sensor 115 located at a task location. The task location may be any location where an individual may be working on a task such as, for example, a desk, a counter, a sink, a workbench, a machine, a chair, etc. The task location may also be any location where consistent lighting is desired.

The light sensor 115 may communicate with the light fixture 105 and/or the light fixture 106 through wireless communication such as, for example, Bluetooth, Wi-Fi, Zigbee, etc. Additionally or alternatively, in some embodiments, the light sensor 115 may be directly wired with the light fixture 105 and/or the light fixture 106 when positioned at the wall 120. In such embodiments, a portion of the light sensor 115 may be removed from its position at the wall 120 to measure light at an alternate location (e.g., at a task location), and returned to the wall 120 where the batteries may be charged and/or where the device may directly control and/or communicate with the light fixture 105 and/or the light fixture 106.

In some embodiments, the light sensor 115 may include a receptacle that is placed on the wall 120. The light sensor 115 may be moved from the task location shown in FIG. 1B to the receptacle at the wall 120 as shown in FIG. 1. The receptacle may physically hold the light sensor 115 at the wall 120 and/or be coupled with a power supply to charge the batteries within the light sensor 115.

The architectural space 100 may also include a window 111 that introduces light 112 into the architectural space 100. While a single window 111 is shown, any number of windows or skylights may be included in the architectural space 100. Moreover, the architectural space 100 may include any other light source that is not a light fixture or that can be controlled from the light sensor 115 such as, for example, a television, a display, a fireplace, a lamp, etc.

Light produced within the architectural space 100 may be produced by controllable light sources (e.g., the light fixture 105 and/or the light fixture 106) and light produced from non-controllable light sources (e.g., the window 111). Light from non-controllable light sources is referred to herein as ambient light, and light from controllable light sources is referred to herein as fixture light. And the total light is the combination of fixture light and ambient light.

FIG. 2 shows the light sensor 115 coupled with the wall 120 according to some embodiments described herein. An alternate mobile device 125 is also shown at a task location. The alternate mobile device 125 may include any device that can detect lux (the luminous flux per unit area) and/or may communicate wirelessly with the light sensor 115 (or the light fixtures 105 and/or 106) such as, for example, a smartphone with a camera, a tablet with a camera, a dedicated auto-commissioning device that includes a photosensor and a radio, etc. The alternate mobile device 125 may measure and/or determine light levels at the task location and send the light levels to the light sensor 115. Embodiments of the invention describing functionality and/or process performed by the light sensor 115 include the alternate mobile device 125 without limitation.

In some embodiments, the light sensor 115 may be a light switch (or dimmer) that is electrically coupled with the light fixture 105 and/or the light fixture 106 via a wire 130. The light sensor 115 may adjust the light output of the light fixture 105 and/or the light fixture 106 via the wire 130 using standard light switch dimming techniques. In some embodiments, the light sensor 115 may also communicate wirelessly with the light fixture 105 and/or the light fixture 106 as shown in FIGS. 1A and 1B and adjust the light output of the light fixture 105 and/or the light fixture 106. Moreover, the light sensor 115 may communicate with the alternate mobile device 125 wirelessly such as, for example, via Bluetooth, Wi-Fi, or Zigbee communication techniques.

Figure 3:
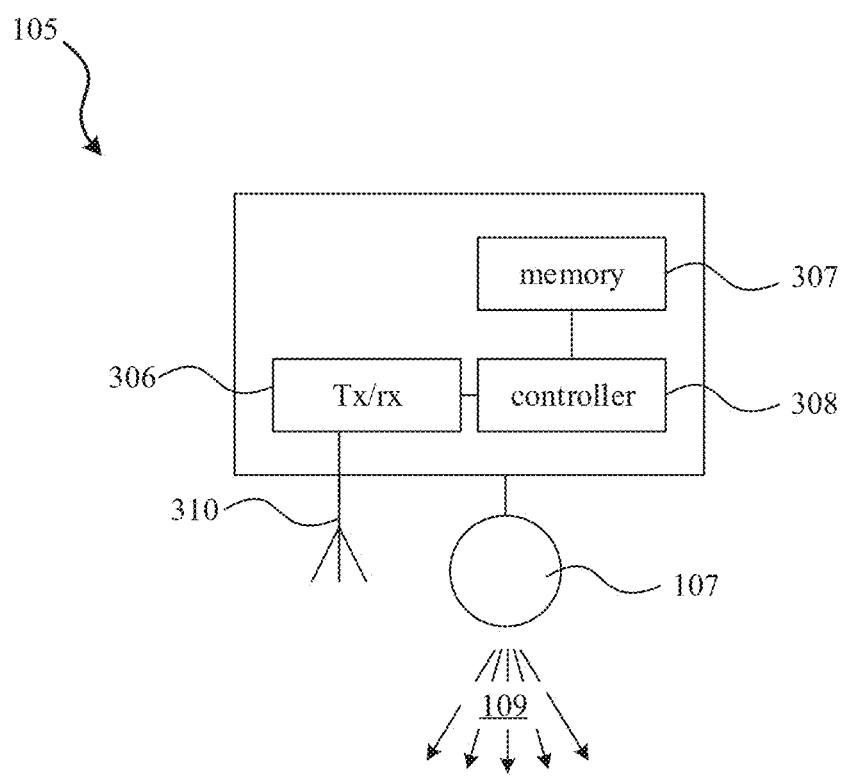
FIG. 3 illustrates a block diagram of a light fixture according to some embodiments described herein.

FIG. 3 illustrates a block diagram of the light fixture 105. The light fixture 106 may include similar blocks and/or components. The light fixture 105 can include a transceiver 306, a memory 307, a fixture controller 308, an antenna 310, and/or the light 107. The fixture controller 308 can be communicatively coupled with the transceiver 306, the memory 307, and/or the light source 107. In some embodiments, the light fixture 105 does not include the light sensor 115, photo sensor, or photodiode.

In some embodiments, the fixture controller 308 may control the output of the light source 107 based on communication from the light sensor 115. In some embodiments, the fixture controller 308 can be programmed, for example, with a program stored in the memory 307, to modulate the light emitted from the light source 107 to encode a burst pattern that includes a fixture identifier that is humanly imperceptible. In some embodiments, the light is modulated in response to receiving instructions from the light sensor 115 to do so through the transceiver 306 and the antenna 310. In some embodiments, the light fixture identifier can be an identifier assigned by the light sensor 115 and/or assigned by the light fixture 105 (and/or light fixture 106). For instance, in order to lower the amount of data encoded, the light sensor 115 can assign the light fixture 105 a temporary fixture identifier comprising two, three, four, five, or six bits. In some embodiments, the light fixture identifier can be uniquely set for each fixture and saved in memory.

The burst pattern can include periods of time when the light fixture 105 emits light at a first luminance level and periods of time when the light fixture 105 emits light at a second luminance level that is less than the first luminance level. The burst pattern can include periods of time when the light fixture 105 emits light at the first luminance level and periods of time when the light fixture 105 does not emit any light. In some embodiments, the total amount of time the light source 107 illuminates light at a second luminance level over a period of 500 microseconds is less than 300, 280, 260, 240, 220, 200, 180, 160, 140, 120, 100, 80, 60, 40, or 20 microseconds give or take five microseconds.

In some embodiments, during transmission of a burst pattern the total amount of time the light source 107 illuminates light at a second luminance level over a period of about 2600 microseconds (give or take 100 microseconds) is less than 400, 380, 360, 340, 320, 300, 280, 260, 240, 220, 200, 180, 160, 140, 120, 100, 80, 60, 40, or 20 microseconds give or take five microseconds.

In some embodiments, during transmission of a burst pattern the percentage of the amount of time the light source 107 illuminates light at the second luminance level compared with the amount of time the light source 107 illuminates light at the first luminance level is less than 70%, 65%, 60%, 55%, 50%, 45%, 40%, 35%, 30%, 25%, 20%, 19%, 18%, 17%, 16%, 15%, 14%, 13%, 12%, 11%, 10%, 9%, 8%, 7%, 6%, 5%, 4%, 3%, 2.5%, 2%, 1.5%, 1%, or 0.5%.

In some embodiments, during transmission of a burst pattern the percentage of the time integral of the amount of time the light source 107 illuminates light at the first luminance level versus the second luminance level is less than 20%, 19%, 18%, 17%, 16%, 15%, 14%, 13%, 12%, 11%, 10%, 9%, 8%, 7%, 6%, 5%, 4%, 3%, 2.5%, 2%, 1.5%, 1%, or 0.5%.

In some embodiments, during transmission of a burst pattern the time integral of the periods of time when the light source 107 (e.g., light-emitting diode) emits light at a second luminance level (or the first luminance level) over a period of 500 microseconds is less than a predetermined value.

In some embodiments, during transmission of a burst pattern the time integral of the function of the luminance level over time of the light source 107 (e.g., light-emitting diode) over a period of time is less than 80%, 70%, 60%, 50%, 40%, 30%, 20%, 10%, or 5% of the greatest luminance level during the period of time times the period of time.

In some embodiments, the burst pattern is modulated using amplitude modulation, frequency modulation, phase-shift keying, frequency-shift keying, amplitude-shift keying, quadrature amplitude modulation, on-off keying, continuous phase modulation, orthogonal frequency-division modulation, wavelet modulation, trellis modulation, spread spectrum modulation, pulse width modulation, pulse position encoding, etc.

In some embodiments, the light fixture 105 can include a semiconductor switching device coupled with the light source 107 and/or the fixture controller 308. The burst pattern can be encoded by shorting or opening the semiconductor switching device to interrupt current to the light source and thus changes the illuminance from a first luminance level to a second luminance level. The semiconductor switching device can include a field-effect transistor (FET), for example, a MOSFET, JFET, etc.

The light fixture 105 can also receive an adjustment value from the light sensor 115 via the transceiver 306 and the antenna 310. In response, the fixture controller 308 can modify the illuminance of the light source 107 (e.g., light-emitting diode) based on the adjustment value. That is, the controller can increase or decrease the illuminance of the light source 107 in response to receiving the adjustment value.

Figure 4:
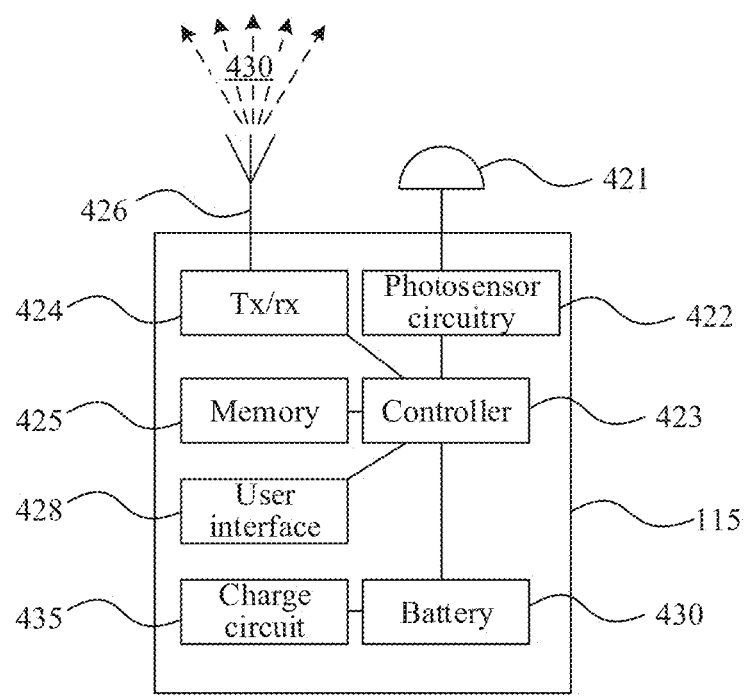
FIG. 4 illustrates a block diagram of a light sensor according to some embodiments described herein.

FIG. 4 illustrates a block diagram of the light sensor 115 according to some embodiments described herein. The light sensor 115 may include a transceiver 424, a memory 425, a light sensor controller 423, an antenna 426, a user interface 428, a battery 430, a charge circuit 435, a photosensor 421 and/or a photosensor circuitry 422. The light sensor controller 423 may be communicatively coupled with the memory 425, the transceiver 424, and/or the photosensor circuitry 422 (and/or the photosensor 421). The battery 430, for example, may be charged via the charge circuit 435 when the charge circuit is coupled with an external power source such as, for example, when the light sensor 115 is coupled with a receptacle (e.g., at the wall 120).

The user interface 428 may include one or more buttons, switches, dials, screens, touch screens, etc. The user interface 428 may be used to input desired light values by a user. Alternatively or additionally, the user interface 428 may be used by a user to request that the light at the current location of the light sensor 115 and/or the task location may be turned up or down.

The light sensor controller 423 can be programmed, for example, with a program stored in the memory 425, to measure the light level (lux) provided at a location (e.g., a task location) and store the light level in memory and/or communicate the light level to another device (e.g., a light switch, a dimmer, and/or the light fixture 105 or 106).

The light sensor controller 423 can be programmed, for example, with a program stored in the memory 425, to receive the burst pattern from the light fixture 105 through the photosensor 421 and/or the photosensor circuitry 422. The light sensor controller 423 may also associate the light fixture identifier with the light fixture. This can occur, for example, by associating the illumination light levels, light fixture identifier, temporary light fixture identifier, burst pattern, etc. in the database. The light sensor controller 423 can also send the adjustment value along with a fixture identifier to the light fixture 105 using the transceiver 424. The adjustment value can be received through a user interface, a dial, a switch, etc. In some embodiments, adjustment value and/or fixture identifiers can be broadcast to a plurality of fixtures using a table or other messaging format either singularly or as a package.

The light sensor controller 423 can receive a plurality of burst patterns from a plurality of the light fixture 105. For instance, the light sensor controller 423 can receive a first burst pattern from a first light source and a second burst pattern from a second light source through the photosensor 421. The first burst pattern can include a first identifier associated with the first light source and the second burst pattern can include a second identifier associated with the second light source. The first identifier can be associated with the first light source and the second identifier can be associated with the second light source.

In some embodiments, the burst pattern may also include an illumination value that represents the illuminance or relative illuminance of the light source.

In some embodiments, the light sensor controller 423 can determine the light contribution of each light fixture 105. The light contribution can represent the light contribution of each of the plurality of light fixtures relative to a total light level detected at the light sensor 115. In some embodiments, the light sensor controller 423 can determine adjustment value based on the light contribution of each light fixture.

Figure 5:
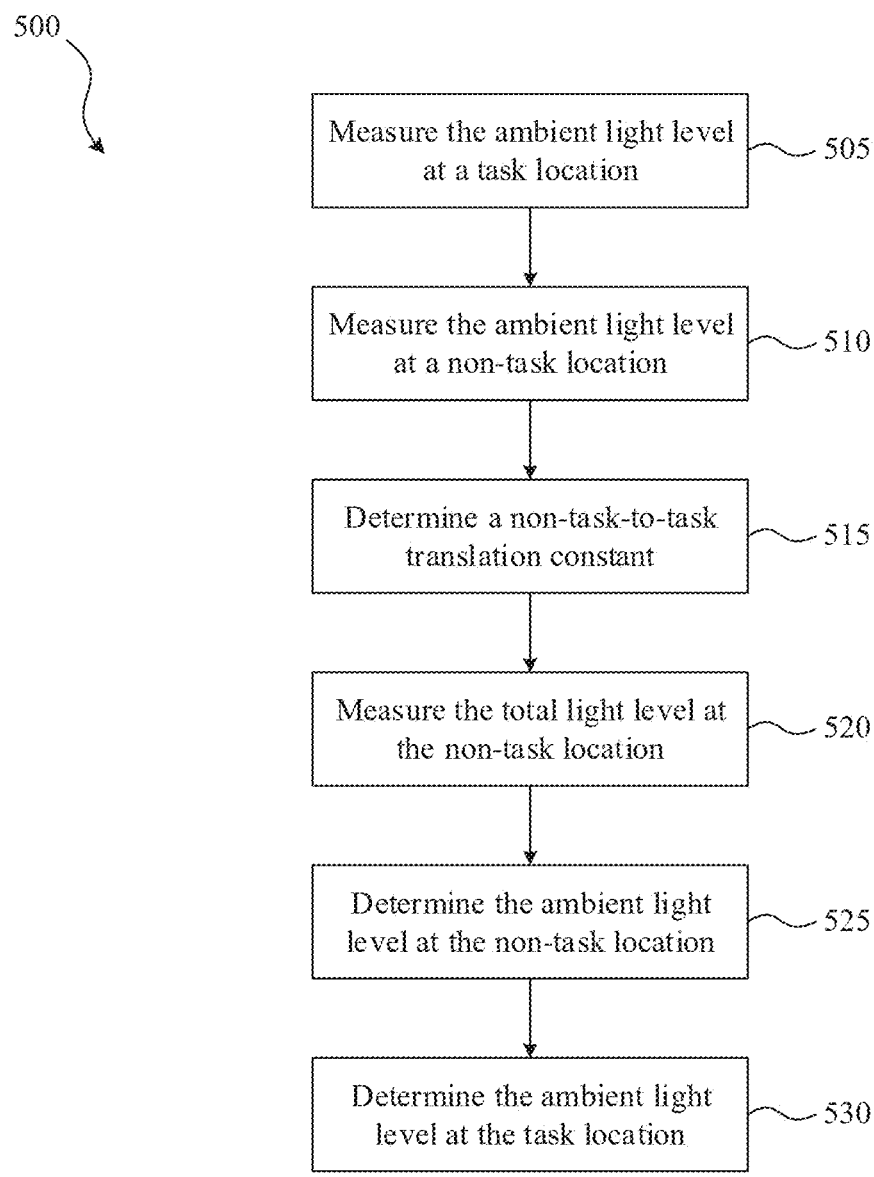
FIG. 5 shows an example flowchart of a process for determining the ambient light level at a task location according to some embodiments described herein.

FIG. 5 shows an example flowchart of a process 500 for determining the ambient light level at a task location according to some embodiments described herein. The process 500 begins at block 505. At block 505 the ambient light level at a task location, $A_{task,1}$ may be measured by the light sensor 115. At block 510 the ambient light level at a non-task location, $A_{non\text{-}task,1}$, may be measured by the light sensor 115. The non-task location, for example, may include a wall location or another location where the light sensor 115 may be stored or placed long term. Blocks 505 and/or 510 may occur in any order and/or may occur at an initial time. For instance, the two blocks may occur within one, two, three, four, five, six, seven, eight, nine, or ten minutes of each other.

The ambient light level, for example, includes the light level when the light source(s) of one or more controllable light fixtures (e.g., the light fixture 105 and/or the light fixture 106) are not illuminating the architectural space 100. In some embodiments, the ambient light level at the task location and at the non-task location may be stored in the memory 425.

In some embodiments, the ambient light level at the non-task location may be measured in response to a user action or when the light sensor 115 determines that it is located at the non-task location. In some embodiments, the ambient light level at the task location may be measured in response to a user action.

At block 515 a non-task-to-task ambient translation may be determined. The non-task-to-task ambient translation may be determined from the ratio of the ambient light level at a task location and the ambient light level measured at the non-task location. Mathematically speaking, the non-task-to-task ambient translation can be expressed as $$C = \frac{A_{task,1}}{A_{non\text{-}task,1}},$$

where $A_{task,1}$ is the ambient light level at the task location, and $A_{non\text{-}task,1}$ is the ambient light level at the non-task location at a first time.

In some embodiments, the non-task-to-task ambient translation and/or the non-task-to-task efficiency translation may be non-linear. The ambient light level at the task location and/or the ambient light level at the non-task location may depend on the time of day, the ambient light level at the task location, the ambient light level at the non-task location, and/or the light output of one or more light fixtures, etc. In such embodiments, a translation table may be used with a number of translation coefficients that vary depending on the time of day, the ambient light level at the task location, the ambient light level at the non-task location, the light output of one or more light fixtures, etc.

In the case where a constant is used, it can be assumed that the non-task-to-task ambient translation remains constant, although later a non-constant version is discussed below. For instance, assuming that the window 111 is a point source, the light 112 from the window 111 will propagate from the window 111 with a $1/r^2$ behavior. That is, the light amount of light at a given point decreases inversely proportionally as the square of the distance from the window 111. The light measured at the task location in the absence of light from the light fixture 105 and/or the light fixture 106, can be expressed by:

$$A_{task,1} = k \frac{A_{window,1}}{r_{task}^2}.$$

Where $A_{task,1}$ is the light measured at the task location at the first time, $A_{window,1}$ is the light 112 coming from the window 111 at the first time, $r_{task}$ is the distance from the window 111 to the task location and k is a constant.

The same can be said for the light measured on the non-task location:

$$A_{non\text{-}task,1} = k \frac{A_{window,1}}{r_{non\text{-}task}^2}.$$

Where $A_{non\text{-}task}$ is the light measured at the non-task location at the first time, $r_{non\text{-}task}$ is the distance from the window 111 to the non-task location and k is a constant.

If $A_{task,1}$ and $A_{non\text{-}task,1}$ can be measured at or near the same point of time, for example, as described in blocks 505 and 510 of the process 500, $A_{window,1}$ in both equations is the same, therefore: $A_{non\text{-}task,1} \cdot r_{non\text{-}task}^2 = A_{task,1} \cdot r_{task}^2$, which shows that the light level times the distance from the window squared remains constant. Assuming the geometry remains constant, then $r_{non\text{-}task}^2$ remains constant and $r_{task}^2$ remains constant, then the non-task-to-task ambient translation, C, can be determined as noted in block 515 of the process 500:

$$\frac{A_{task,1}}{A_{non\text{-}task,1}} = \frac{r_{non\text{-}task}^2}{r_{task}^2} = C.$$

At block 520, the total light level at the non-task location, $L_{non\text{-}task,2}$, may be measured using the light sensor 115. Block 520 may occur at a second time later than the time that blocks 505 and/or 510 occur. The first time, for example, may be hours, days, weeks, months, or years prior to the second time. At block 525, the ambient light at the non-task location, $A_{non\text{-}task,2}$, may be determined in any number of ways from the total light level at the non-task location. In some embodiments, blocks 520 and 525 may occur in conjunction with one another.

In some embodiments, the ambient light level at the non-task location, $A_{non\text{-}task,2}$, may be measured at the non-task location by measuring the difference in the amount of light measured at the light sensor 115 when the light fixture 105 (and/or the light fixture 106) sends a burst pattern. The burst pattern may comprise periods of time when the light fixture 105 is on and periods of time when the light fixture 105 is off. The difference in the light level measured at these different times may be the ambient light level, $A_{non\text{-}task,2}$.

In another embodiment, the light sensor 115 may send a signal to the light fixture 105 (and/or the light fixture 106) to turn off. When the light fixture 105 is off, the ambient light level, $A_{non\text{-}task,2}$, may be measured at the light sensor 115. The light sensor 115 may then send a signal to the light fixture 105 to turn back on. The amount of time the light fixture is off may be humanly imperceptible such as, for example, less than 400, 380, 360, 340, 320, 300, 280, 260, 240, 220, 200, 180, 160, 140, 120, 100, 30, 60, 40, or 20 microseconds and/or as described elsewhere herein.

In another embodiment, the ambient light level at the non-task location, $A_{non\text{-}task,2}$, may be determined from a linear projection of light at the non-task location as the percentage of light produced by the light fixture 105 varies. For example, the light sensor 115 may communicate to the light fixture 105 to emit light at a first percentage of the maximum light output, $LO_1$. The light sensor 115 may then measure the total light level, $TL_1$. The light sensor 115 may then communicate to the light fixture 105 to emit light at a second percentage of the maximum light output, $LO_2$. The light sensor 115 may then measure the total light level, $TL_2$. From the two light values and the two percentages of maximum light output, the amount of light measured at zero percent light output may be extrapolated from:

$$A_{non\text{-}task,2} = \frac{LO_1 \cdot TL_2 - LO_2 \cdot TL_1}{LO_1 - LO_2}.$$

At block 530, the ambient light level at the task location at the second time, $A_{task,2}$, may be determined from the ambient light at the non-task location, $A_{non\text{-}task,2}$, using the non-task-to-task ambient translation:

$A_{task,2} = C \cdot A_{non\text{-}task,2}.$

In some embodiments, the ambient light level at the task location, $A_{task,2}$, may be output to another device such as, for example, the light fixture 105 and/or the light fixture 106. In some embodiments, the ambient light level at the task location, $A_{task,2}$, may be used to determine a light adjustment value for the light fixture 105 and/or the light fixture 106, which may be sent to the light fixture. Moreover, the ambient light level at the task location, $A_{task,2}$, may be used for any other purpose.

Figure 6:
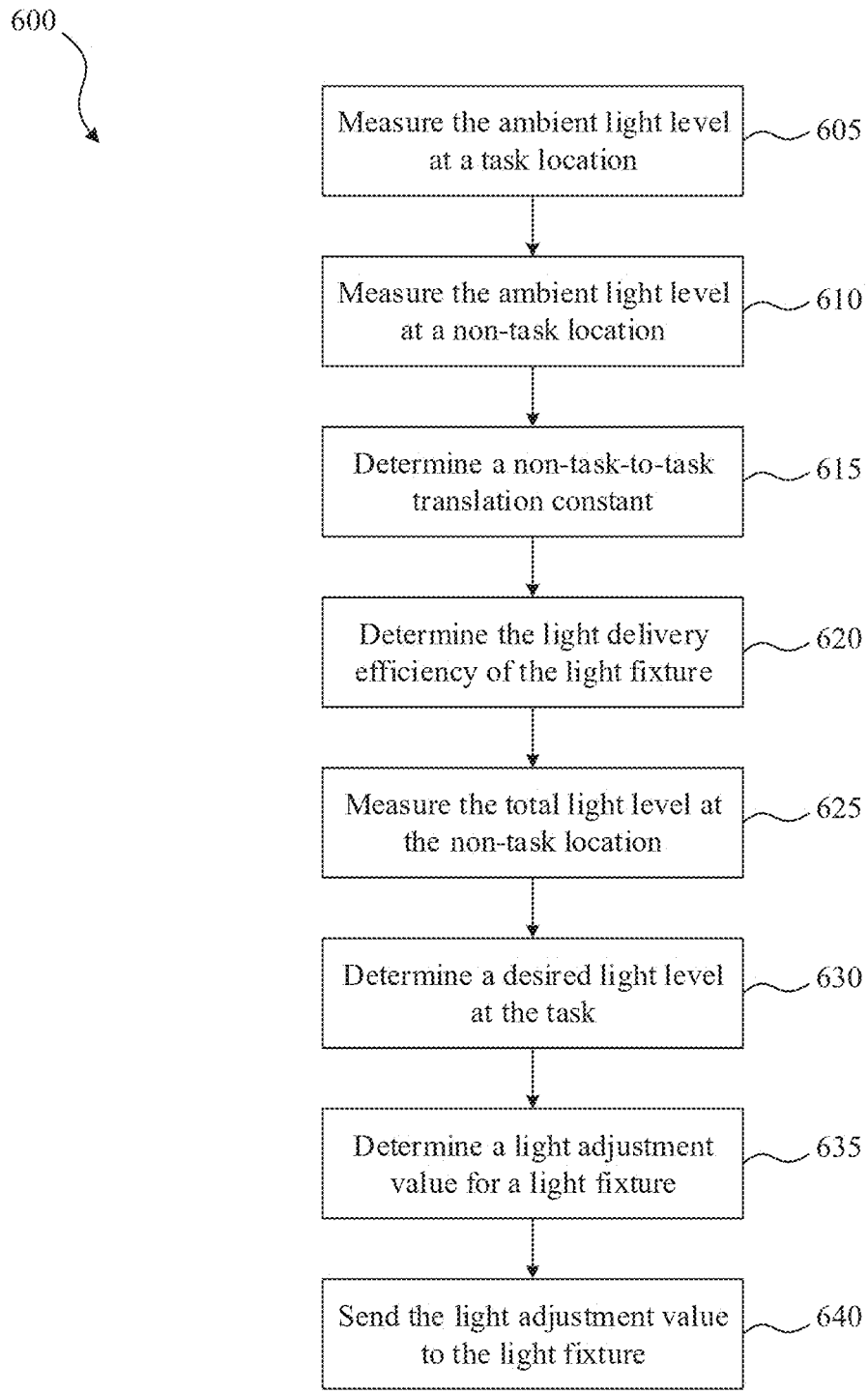
FIG. 6 is an example flowchart of a process for determining a light adjustment value for the light fixture according to some embodiments described herein.

FIG. 6 is an example flowchart of a process 600 for determining a light adjustment value for the light fixture 105 according to some embodiments described herein. The process 600 starts at block 605. At block 605, the ambient light level at the task location, $A_{task,1}$, can be measured with the light sensor 115 and/or the alternate mobile device 125. The ambient light level at the task location, $A_{task,1}$, may be measured in response to receiving an indication from a user through the user interface 428.

At block 610 the ambient light level at a non-task location (e.g., at the wall 120), $A_{non\text{-}task,1}$, can be measured with the light sensor 115 and/or the alternate mobile device 125. The ambient light level at the non-task location, $A_{non\text{-}task,1}$, may be measured in response to receiving an indication from a user through the user interface 428 or in response to the light sensor 115 determining that it is located at the non-task location as described further in a process 700 of FIG. 7. Block 605 and block 610 may occur at a first time or close to a first time. For instance, the two blocks may occur within one, two, three, four, five, six, seven, eight, nine, or ten minutes of each other.

At block 615, the non-task-to-task ambient translation may be determined from the ambient light level at the non-task location, $A_{non\text{-}task,1}$, and the ambient light level at the task location, $A_{task,1}$, from:

$$C = \frac{A_{task,1}}{A_{non\text{-}task,1}}.$$

At block 620 a light delivery efficiency of the light fixture 105 at the non-task location, $E_{non\text{-}task,1}$, and/or at the task location, $E_{task,1}$, may be determined. The light delivery efficiency of the light fixture at the non-task location, $E_{non\text{-}task,1}$, may be determined as the ratio of the light level of the light fixture 105, $F_{non\text{-}task,1}$, at the non-task location, which may be the total light level at the non-task location measured in lux, $L_{non\text{-}task,1}$, minus the ambient light level at the non-task location, $A_{non\text{-}task,1}$, and the amount of light emitted at the light fixture, $L_{fixture,1}$ measured in lumens:

$$E_{non\text{-}task,1} = \frac{F_{non\text{-}task,1}}{L_{fixture,1}} = \frac{L_{non\text{-}task,1} - A_{non\text{-}task,1}}{L_{fixture,1}},$$

and similarly:

$$E_{task,1} = \frac{F_{task,2}}{L_{fixture,1}} = \frac{L_{task,1} - A_{task,1}}{L_{fixture,1}}.$$

It can be assumed that the light delivery efficiency of the light fixture 105 may be constant over time. A non-task-to-task efficiency translation can also be determined:

$$K = \frac{E_{task,1}}{E_{non\text{-}task,1}}.$$

Given the lighting parameters measured and or determined in blocks 605, 610, 615, and/or 620, the light sensor 115 can remotely control the light level at the task location without directly measuring the light level at the task location. Moreover, the light sensor 115 can maintain consistent or relatively consistent lighting at the task location. By monitoring changes in light level at the non-task location the light sensor 115 may translate those light changes to a light adjustment value for the light fixture 105 (and/or the light fixture 106) to maintain the desired light level at the task location.

One benefit of this, for example, is that daylight changes may be incorporated into the light at task and may result in saved energy. Another possible benefit is that a desired light level may be maintained at the task location so that people have exactly the light level they want.

At block 625, the total light level at the non-task location, $L_{non-task,2}$, may be measured at a second time. By knowing the light delivery efficiency of the light fixture 105 at the non-task location, $E_{non-task,1}$, and knowing the amount of light being produced by the light fixture 150, $L_{fixture,2}$, the ambient light level at the non-task location can be determined:

$$A_{non-task,2} = L_{non-task,2} - F_{non-task,2} = L_{non-task,2} - E_{non-task,2} \cdot L_{fixture,2}.$$

The amount of light being produced by the light fixture 105, $L_{fixture}$, can be determined from the maximum output value of the light fixture, $L_{max\ fixture}$, and the percentage of the maximum light output of the light fixture. The percentage of the maximum light output of the light fixture may be known by the light sensor 115 and communicated to the light fixture 105.

Using the non-task-to-task ambient translation, C, the ambient light amount at the task location can be determined from:

$$A_{task,2} = A_{non-task,2} \cdot C.$$

At block 630 a desired light amount, $L_{desired\ at\ task}$, may be determined for the task location. The desired light amount at the task location may be determined from a user input at the light sensor 115 and/or at the alternate mobile device 125. The user input, for example, may include a button press from the user indicating that the light level should increase or decrease.

At block 635, a light fixture adjustment value for the light fixture 105, $L_{adjustment}$, may be determined:

$$\begin{aligned}L_{adjustment} &= L_{desired\ at\ task} - C \cdot A_{non-task,2} \\ &= L_{desired\ at\ task} - C \cdot (L_{non-task,2} - E_{non-task,2} \cdot L_{fixture,2}) \\ &= L_{desired\ at\ task} - \frac{A_{task,1}}{A_{non-task,1}} \cdot (L_{non-task,2} - E_{non-task,2} \cdot L_{fixture,2}).\end{aligned}$$

The adjustment value may also be written as an adjustment percentage:

$$L_{\%\ adjustment} = \frac{L_{desired\ at\ task} - C \cdot (L_{non-task,2} - E_{non-task,2} \cdot L_{fixture,2})}{L_{max\ fixture}}.$$

The light desired at the task location, $L_{desired\ at\ task}$, may be determined, for example, from previous measurements of the light level at the task location. This level may be desired to ensure that the light level at the task location remains constant or relatively constant.

At block 640, the light sensor 115 may communicate either or both the light fixture adjustment value, $L_{adjustment}$, and/or the light fixture adjustment percentage, $L_{\%\ adjustment}$, to the light fixture 105. Alternatively or additionally, the light sensor 115 may adjust the light fixture 105 to produce light corresponding with the light fixture adjustment value, $L_{adjustment}$, or adjust the light fixture to a percentage of the fixture's maximum illumination as per the light fixture adjustment percentage, $L_{\%\ adjustment}$.

Alternatively or additionally a light adjustment value may be determined from the non-task-to-task efficiency translation, K, and the light measured at task as shown below:

$$L_{adjustment} = L_{desired\ at\ task} - K L_{non-task,2}.$$

Figure 7:
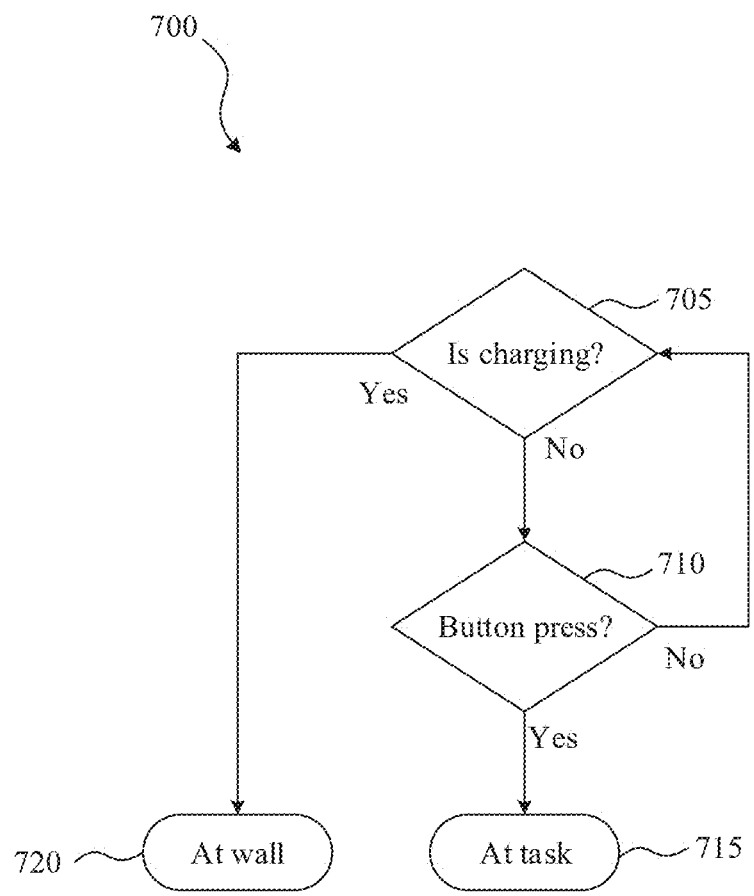
FIG. 7 is an example flowchart of a process for determining whether the light sensor is positioned at the task location or at a wall location according to some embodiments described herein.

The light sensor 115 may determine whether it is at the task location in any number of ways. For instance, FIG. 7 is an example flowchart of the process 700 for determining whether the light sensor 115 is positioned at the task location or at a wall location according to some embodiments described herein. The process 700 starts at block 705. At block 705, it can be determined whether the light sensor 115 is charging, for example, through the charge circuit 435. If the light sensor 115 is charging, then it can be assumed that it is placed in the charging receptacle at the wall at block 720.

If the lighting sensor is not charging, then at block 710 it can be determined whether a button of the user interface 428 (or a portion of a touch screen of the user interface 428 representing a button) has been pressed, for example, a button indicating taking an at-task light measurement. If the button has been pressed, then the process 700 assumes that the lighting sensor is located at the task location at block 715. Otherwise the process 700 repeats until it can be determined whether the lighting sensor is located at the task location or at the wall location.

In some embodiments, the light sensor 115 may be positioned at the wall, for example, as shown in FIG. 2, and the alternate mobile device 125 may be positioned at the task location. The mobile device may know it is at the task location when a user has pressed a button indicating that it is at the task location.

Figure 8:
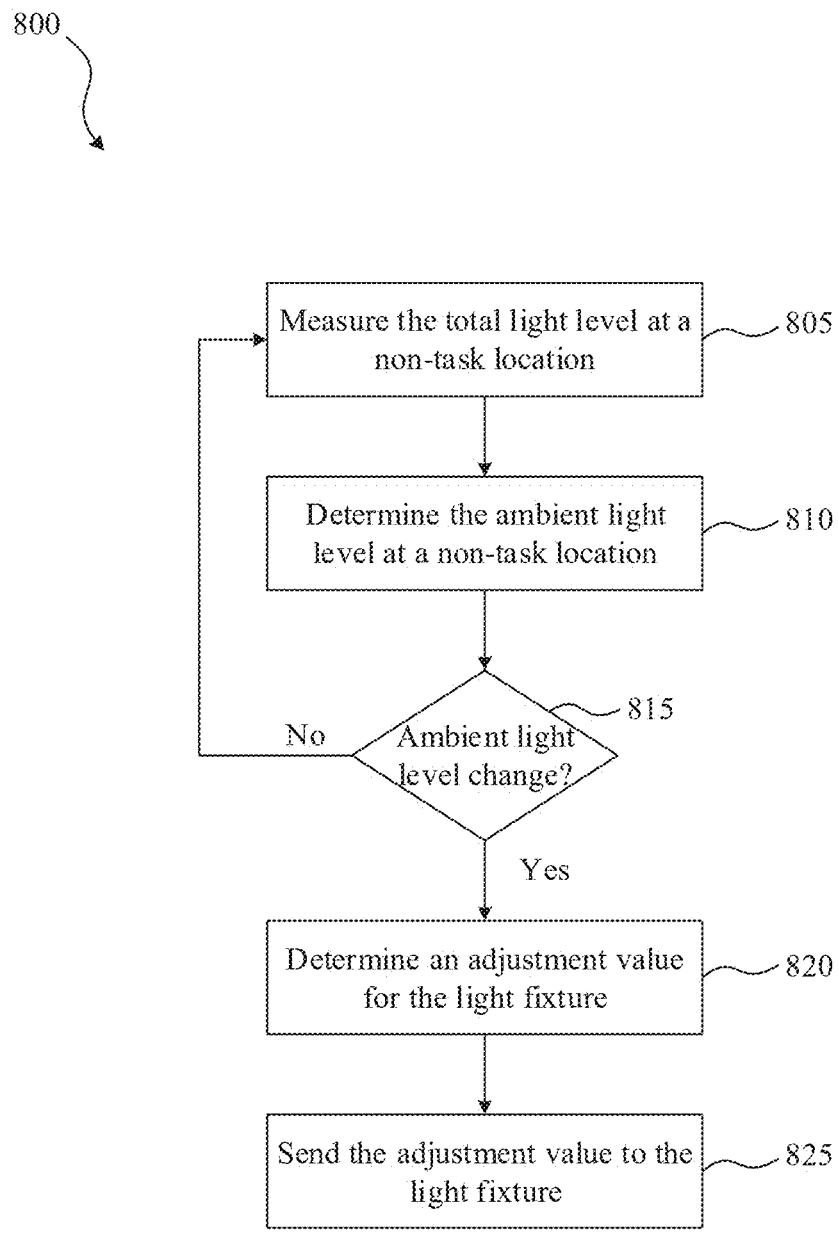
FIG. 8 is an example flowchart of a process for determining an adjustment value for a light fixture according to some embodiments described herein.

FIG. 8 is an example flowchart of a process 800 for determining an adjustment value for a light fixture according to some embodiments described herein. The process 800 starts at block 805. At block 805, the total light level at a non-task location, $L_{non-task}$, can be measured by the light sensor 115. The light sensor 115 may have previously determined a non-task-to-task ambient translation, C, and/or light efficiencies at the non-task location, $E_{task}$. These values may have been stored in the memory 425 at the light sensor 115.

At block 810, it can be determined whether the light level at a non-task location has changed since the last measurement. For example, whether $|\Delta L_{non-task}| > 0$, where $\Delta L_{non-task}$ is the change in the light level at the non-task location—where $\Delta L_{non-task} = L_{non-task,2} - L_{non-task,1}$. In some embodiments, a running average of the change in the light level at the non-task location may be used to adjust for brief shadowing of the light sensor 115 at the non-task location but that do not affect the task location.

If the light level at the non-task location has changed as determined at block 815, it can be assumed that the level at the task location has also changed and the process 800 proceeds to block 820. Otherwise the process 800 returns to block 805. In some embodiments, the process 800 may pause between blocks 815 and 805.

At block 820 a light adjustment value for a light fixture may be determined. The light adjustment value, for example, may be determined from:

$$L_{adjustment} = -E_{task} \cdot \Delta L_{task} = -E_{task} \cdot C \cdot \Delta L_{non-task}.$$

The light adjustment value may also be presented as a percentage change:

$$L_{adjustment} = \frac{-E_{task} \cdot C \cdot \Delta L_{non-task}}{L_{max\ fixture}}.$$

At block 820, the light adjustment value may be sent to the light fixture. Alternatively, the light adjustment value may be applied to a dimmer switch controlled by the light sensor 115.

In some embodiments, the light sensor 115 may learn as it goes and may not require a separate setup, calibration, or commissioning step to determine any of the constants and/or tables (e.g., a non-task-to-task ambient translation table and/or the non-task-to-task efficiency translation) described herein. The translation parameters may start with initial defaults, and then are refined over time as the system learns more about its environment.

For example, the light turn-on time may provide an opportunity to learn about both the ambient light and the light delivery efficiency at either the task location or the wall location. When a person presses the "on" button, the light fixture 105 is off, and so the ambient light level can be measured directly. As the lights ramp up, the system can make step changes to the light level and observe the changes in light detected, and calculate the light delivery efficiency using these deltas as described above.

As another example, the light turn-on time may also provide an opportunity to create a non-task-to-task ambient translation table. The non-task-to-task ambient translation table may be revised and/or updated throughout use of the system.

Also, the location of the sensor can be inferred as described above by examining whether there is a battery charge input voltage, and detecting the time of button presses. Instead of requiring a separate calibration procedure, the light sensor 115 may watch the person using it, and uses the information generated by that person in the course of naturally using the system to make the system better.

In some embodiments, no separate setup, calibration, or commissioning step may be needed.

Figure 9:
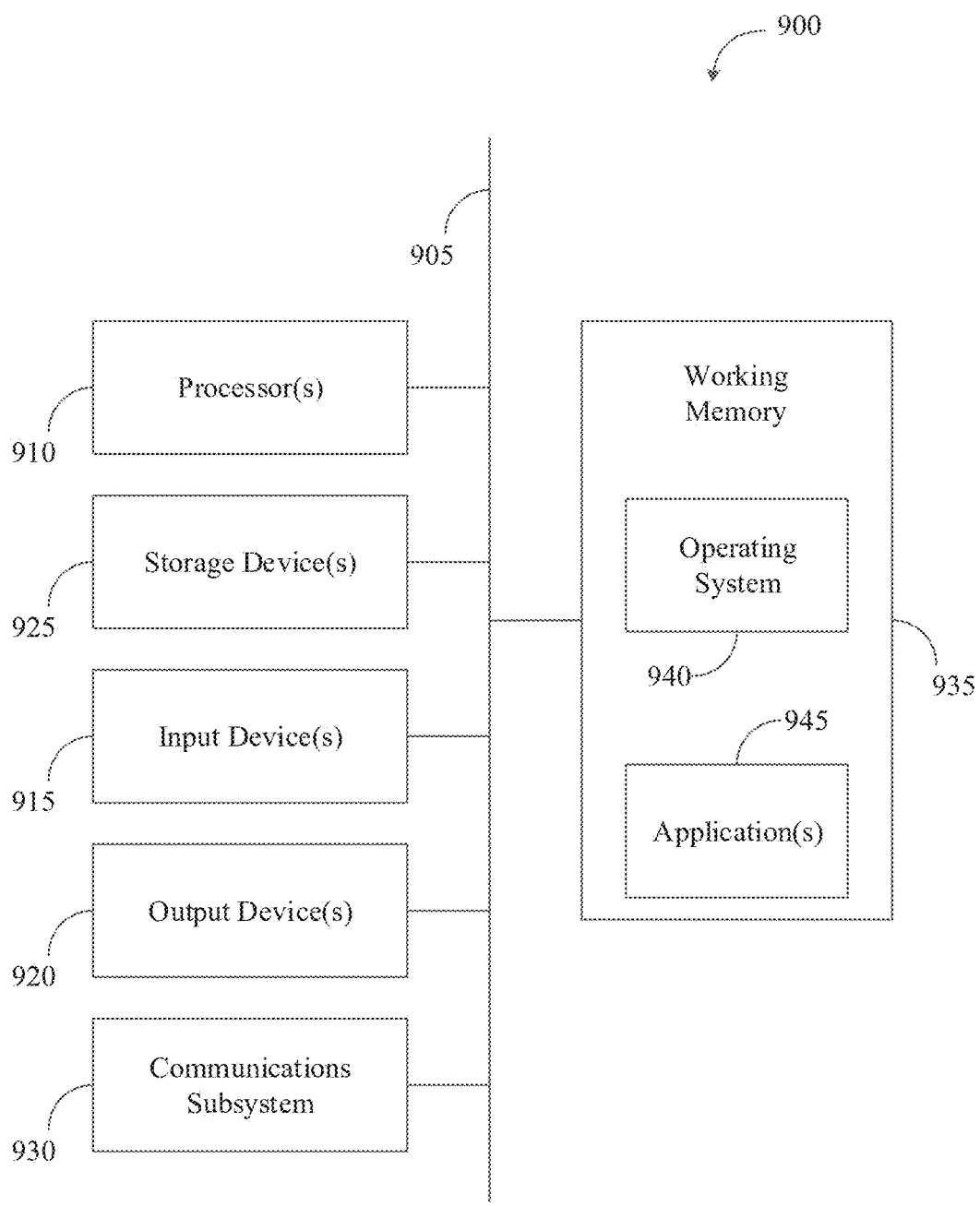
FIG. 9 illustrates an example computational system for performing functionality to facilitate implementation of embodiments described herein.

A computational system 900 (or processing unit) illustrated in FIG. 9 can be used to perform any of the embodiments of the invention. For example, the computational system 900 can be used alone or in conjunction with other components. As another example, the computational system 900 can be used to perform any calculation, solve any equation, perform any identification, make any determination described herein, and/or execute all or part of the processes 500, 600, 700, and/or 800. The computational system 900 includes hardware elements that can be electrically coupled via a bus 905 (or may otherwise be in communication, as appropriate). The hardware elements can include one or more processors 910, including, without limitation, one or more general-purpose processors and/or one or more special-purpose processors (such as digital signal processing chips, graphics acceleration chips, and/or the like); one or more input devices 915, which can include, without limitation, a mouse, a keyboard, and/or the like; and one or more output devices 920, which can include, without limitation, a display device, a printer, and/or the like.

The computational system 900 may further include (and/or be in communication with) one or more storage devices 925, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 900 might also include a communications subsystem 930, which can include, without limitation, a modem, a network card (wireless or wired), an infrared communication device, a wireless communication device, and/or chipset (such as a Bluetooth device, a 902.6 device, a Wi-Fi device, a WiMax device, cellular communication facilities, etc.), and/or the like. The communications subsystem 930 may permit data to be exchanged with a network (such as the network described below, to name one example) and/or any other devices described herein. In many embodiments, the computational system 900 will further include a working memory 935, which can include a RAM or ROM device, as described above.

The computational system 900 also can include software elements, shown as being currently located within the working memory 935, including an operating system 940 and/or other code, such as one or more application programs 945, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 925 described above.

In some cases, the storage medium might be incorporated within the computational system 900 or in communication with the computational system 900. In other embodiments, the storage medium might be separate from the computational system 900 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 900 and/or might take the form of source and/or installable code, which, upon compilation and/or installation on the computational system 900 (e.g., using any of a variety of generally available compilers, installation programs, compression/decompression utilities, etc.), then takes the form of executable code.

Embodiments of the invention include a daylighting, digital, dimming (D3) light switch for solid-state lighting that incorporates an architecture referred to as task-to-wall sensing and control (TTW). In some embodiments, a D3 light switch may replace a traditional light switch, or analog dimmer, with a smart SSL wall dimmer equipped with a photosensor, state-of-the-art Bluetooth Low Energy (BTLE) RF communication, and the proposed TTW technology that may enable energy savings via daylighting without separate ceiling-mounted photosensors. Installation as simple as a traditional light switch will attract home and business users to adopt advanced intuitive energy-savings lighting controls that incorporate daylighting, while maintaining occupant comfort and productivity.

Remote, task-based light sensing and control enabled by the TTW architecture is made possible, and affordable, by combining two technologies. Some embodiments include a photosensor with wavelength sensitivity of the human eye directly into a wall-based light switch instead of mounting a separate daylighting monitor unit on the ceiling. In some embodiments the ambient light-sensing capability of a personal device and using the app capability of the personal device to guide the user through the intuitive setup process to translate the desired lighting in the task location to the illumination measured and controlled by the D3 light switch—referred to as the TTW technology. In some embodiments, a D3 light switch may also be able to enable additional light savings techniques referred to as personal dimming, high-end trim, and scheduling (programmable lighting intervals), as has been readily adopted in programmable thermostat controls.

Figure 10:
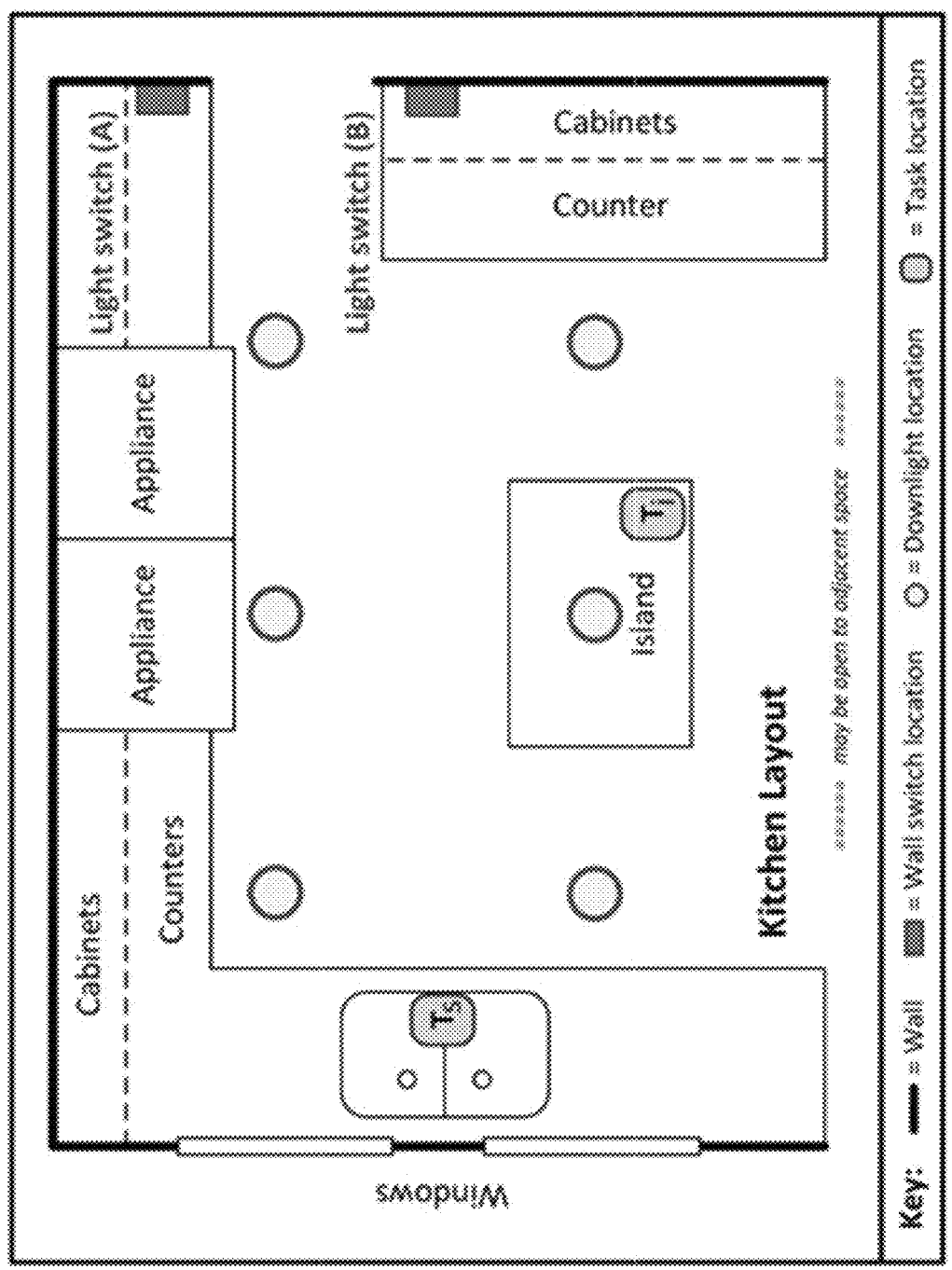
FIG. 10 illustrates a typical single kitchen space with two potential light switch placements (A) and (B) according to some embodiments described herein.

FIG. 10 illustrates a typical single kitchen space with two potential light switch placements (A) and (B) that provide two different views from the light switch into the kitchen. As illustrated in FIG. 10, a space, such as a kitchen, may have more than one placement of the controlling light switch (A, B) leading to different views of the space. Additionally, the occupant may change the task location within the space. For example, the important task area may be the sink (Ts) or the island (Ti), or at a point in between to allow the occupant to work comfortably at either task location as illustrated in FIG. 10.

Figure 11:
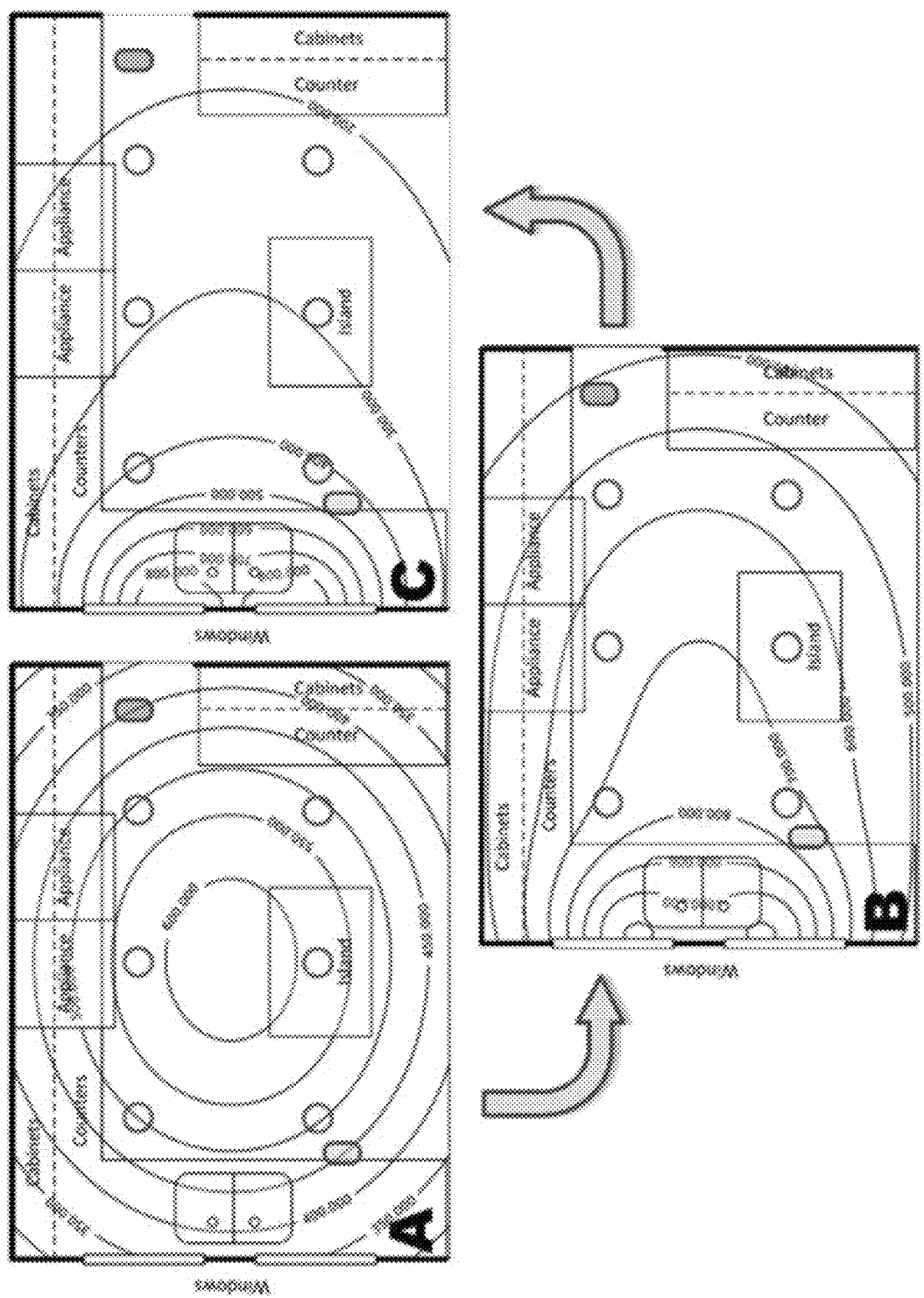
FIG. 11 illustrates changes in the lighting profile as viewed from the task location (lower left) and wall switch location (upper right) for the Kitchen Layout from FIG. 10.

FIG. 11 illustrates lighting as viewed from the task location (lower left) and wall switch location (upper right) for the Kitchen Layout from FIG. 10. A represents the space with downlights only. B is the same space over illuminated by the appearance of full daylight and no adjustment to the downlights. C is the illumination after daylighting to maintain the task location at the same illumination in A. The TTW algorithm may address the change in illumination perceived at the sensor location to the amount of light dimming necessary to maintain the illumination at the task location. The values of the contour lines are in lux.

The kitchen shown in FIG. 10 has two defined task points: the sink ($T_s$) and the kitchen island ($T_i$). The tasks performed at these points require effective levels of illumination. The kitchen has a light switch located where the occupants enter from an adjacent room, (A) and (B), and therefore the light switch is at a location that is not close to either task location or the windows. This physical layout makes this kitchen a particularly challenging environment for the D3 light switch since it may sense the illumination changes remotely from the task location.

Figure 12:
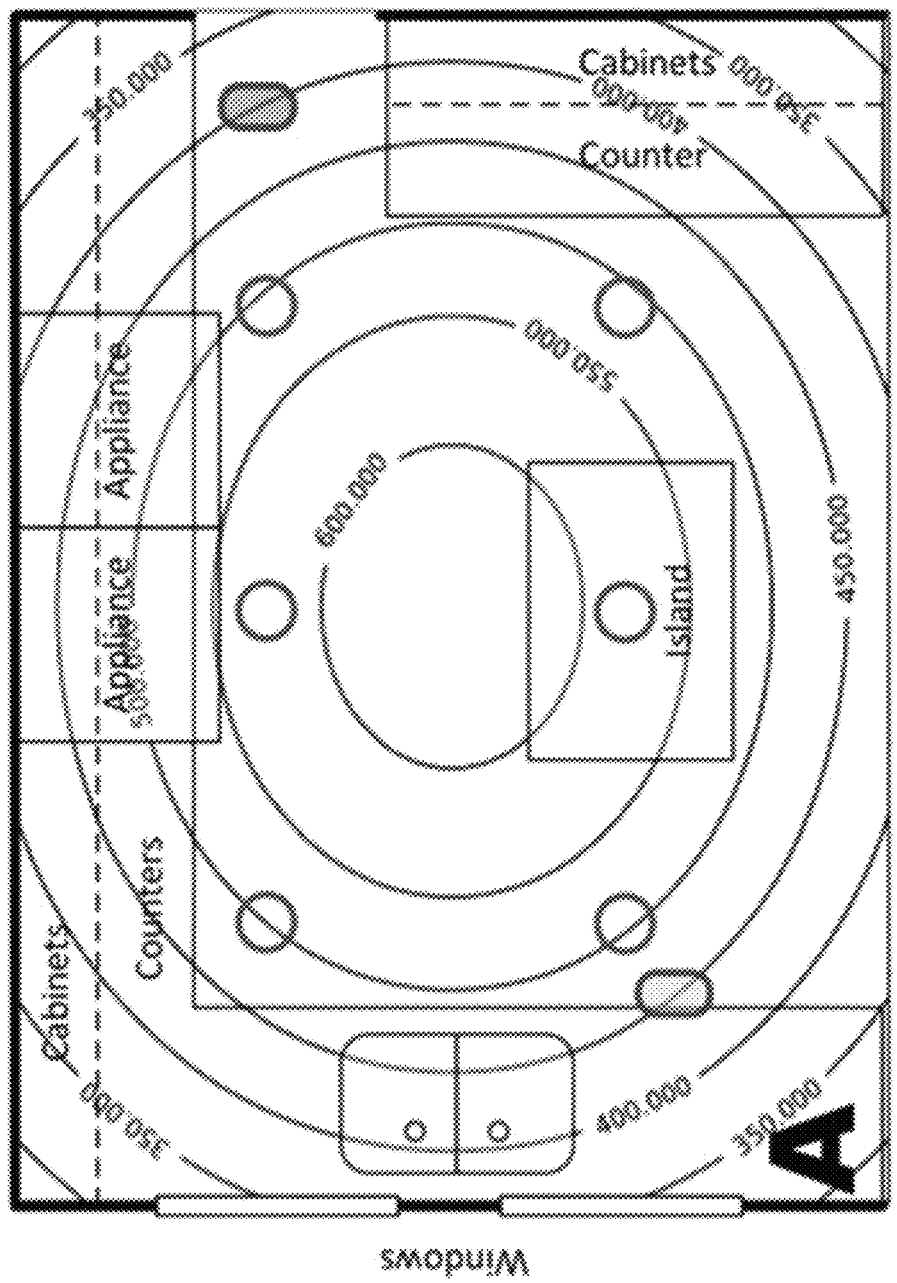
FIG. 12 illustrates a lighting profile of a kitchen without ambient lighting.
Figure 13:
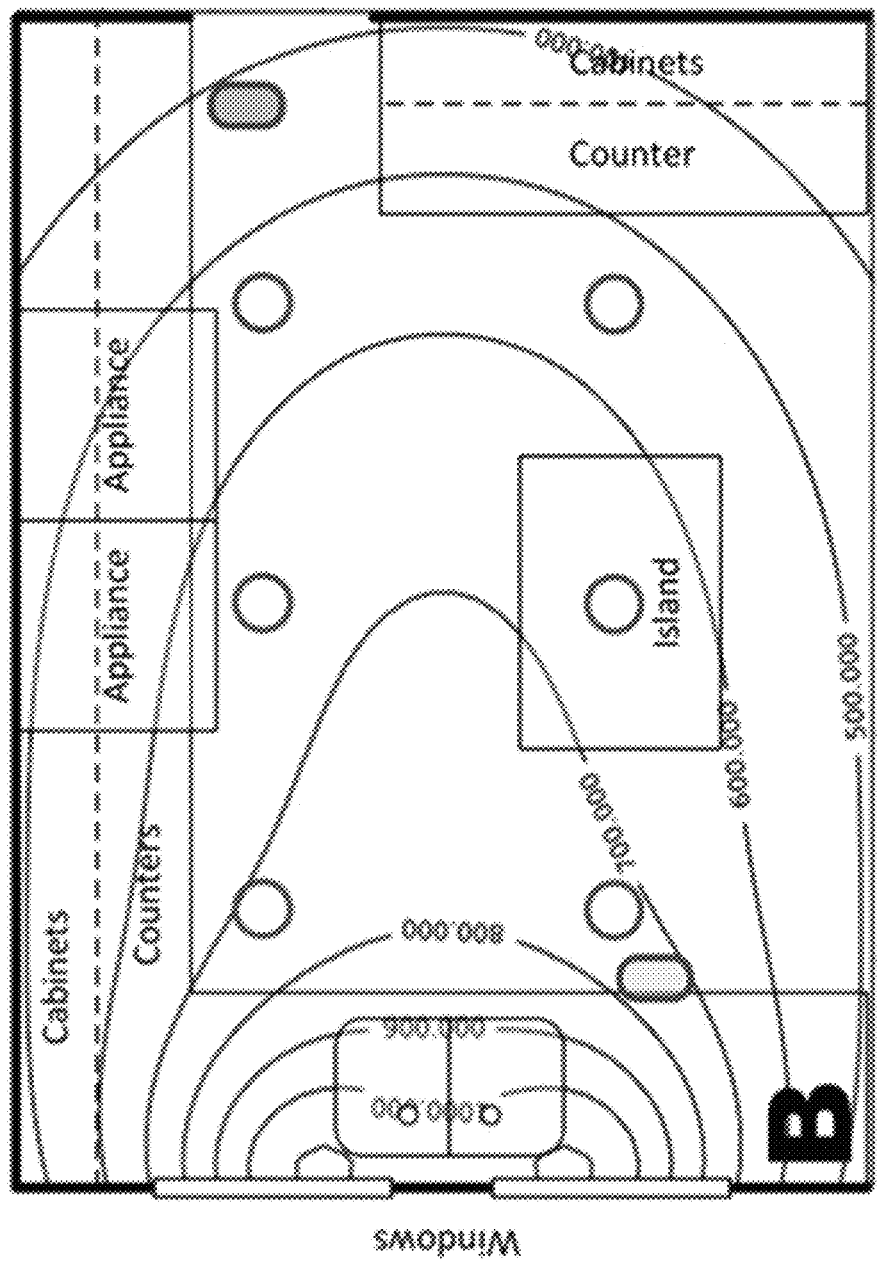
FIG. 13 illustrates a lighting profile of a kitchen with ambient lighting.
Figure 14:
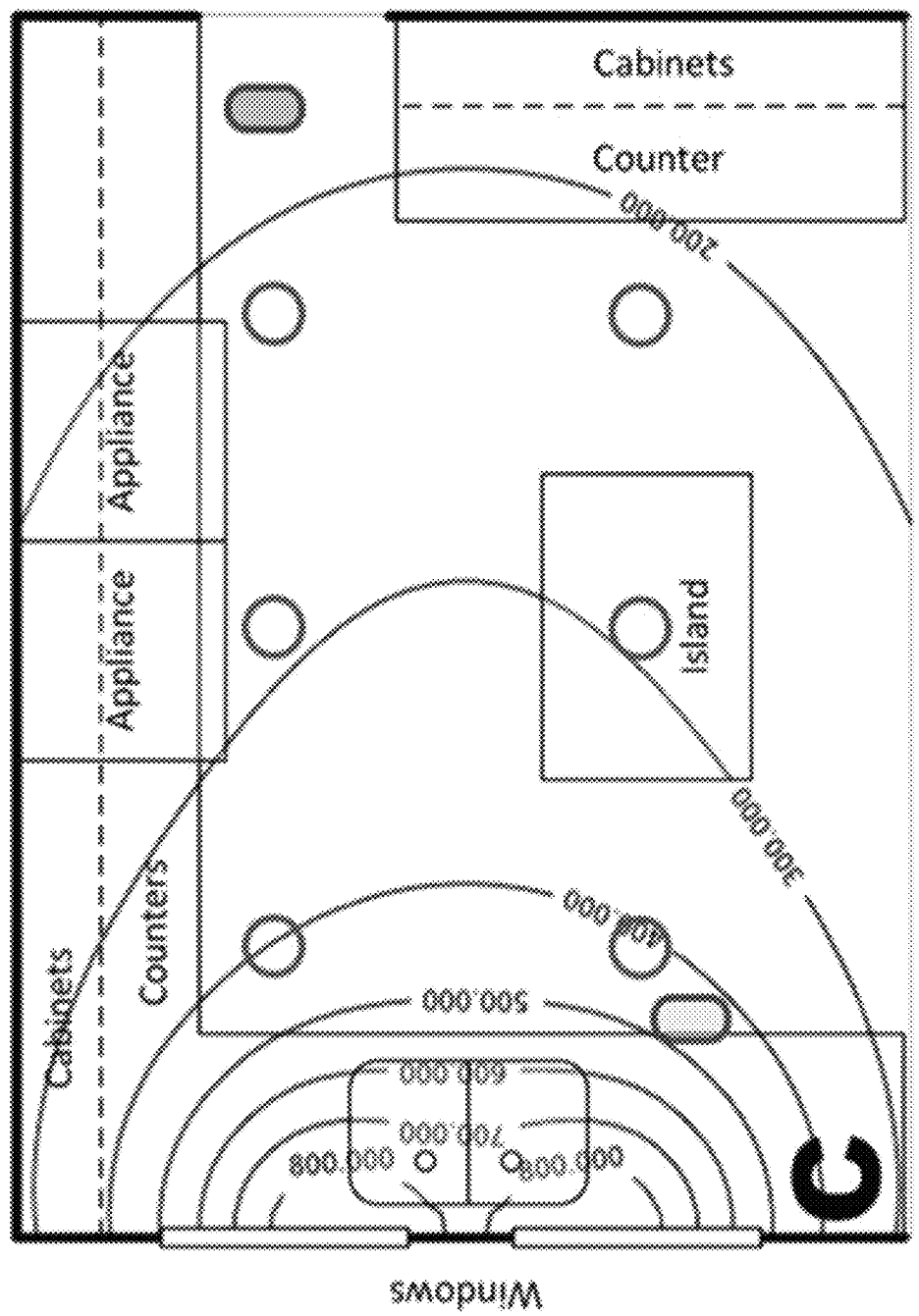
FIG. 14 illustrates a lighting profile of a kitchen with ambient lighting and control of the controllable light sources.

Embodiments of the invention can include indirect illumination sensing. As illustrated in FIG. 11, sensing the illumination level (in lux) at the task location and accurate measurement of the effect of changing the dimming percentage of the downlights cannot be sensed directly at the light switch location. The photocell in the D3 light switch can only sense variations in apparent ambient light over time and translate the change in ambient light levels to the current illumination at the task location. For example, the illumination at the light switch changed from approximately 400 lux (FIG. 12) without any light contribution from the windows, to 430 lux (FIG. 13) with light from the windows. To accomplish illumination control at the task location, the increased illumination sensed at the light switch location, in conjunction with knowledge associated with the downlights and knowledge of light propagation from the windows, may lead to the model showing that the dimmer will lower the sensed illumination by 250 lux, to approximately 180 lux (in FIG. 14), to reduce the illumination at the task location by 300 lux, from 750 to 450 lux. The progression of this example is shown in Table 1.

TABLE 1

Summary of lighting scenarios in the representative space.

| Lighting Scenario | Light switch (1x) | Task (1x) | Downlight (1 m) |
|---|---|---|---|
| Downlights only | 400 | 450 | 700 each |
| Downlights and Windows | 430 | 750 | 700 each |
| Daylighting | 180 | 450 | 260 each |

Some embodiments of the invention include sensing the ambient light level change over time and translating the sensed change into a differential percent dimming to adjust the downlight contribution to the space illumination. The relationship between the light observed at the wall sensor with respect to the light actually present at the task location is the key technology underlying the proposed TTW architecture that is developed in this task.

Some embodiments of the invention include determining translation values for ambient light and/or fixture light-delivery effectiveness. In the model kitchen, sunlight light (ambient light) propagates from the windows to both the task location and the light switch location. As the light contribution from the sunlight changes, the overall illumination will change more at the task location than at the light switch location because the task location, in this model case, is closer to the windows. Knowledge of the difference in how the ambient illumination levels change allows the TTW algorithm to translate the illumination between the two locations.

Specifically, light propagates from windows as an inverse square propagation. This is true, unless both the task location and wall location are both in direct sunlight. The light at the task location in the absence of other light sources can be expressed by:

$$A_{task} = k(A_{window})(1/R_{task}^2).$$

Where $A_{task}$ is the light measured at the task location, $A_{window}$ is the light contribution coming from a window, or other ambient source, and $R_{task}$ is the distance from the window to the task location. k is a constant. The same relationship can be expressed for the light measured at the wall-mounted light switch:

$$A_{wall} = k(A_{window})(1/R_{wall}^2).$$

If the system can measure $A_{task}$ and $A_{wall}$ at the same point in time, $A_{window}$ is the same for both. Solving both sides for $A_{window}$ and setting them equal to each other yields:

$$A_{wall} R_{wall}^2 = A_{task} R_{task}^2$$

This shows that the light level times the distance from the window squared is preserved. If the geometry remains constant, then $R_{wall}^2$ remains constant and $R_{task}^2$ remains constant. Rewriting Eq. 3:

$$\frac{A_{wall}}{A_{task}} = \frac{R_{wall}^2}{R_{task}^2} = \text{constant.}$$

One divided by this constant is also constant and provides a translation factor for the light sensed at the wall to translate to the light at the task location ($AT_{wt}$=ambient translation from wall to task):

$$AT_{wt} = \frac{A_{task}}{A_{wall}}.$$

The translation factor shows that the ratio of ambient light measured at task to the wall remains constant. Therefore, any change of ambient light measured at the wall can be translated to ambient light at task by multiplying the detected change by the constant proportion. This same relationship holds true for any relationship between the task location and wall location with respect to the source, or sources, of ambient light.

Similarly, light propagates from the downlight fixtures to both the task location and the light switch location. Because the illumination relationship from the downlights applies a different illumination relationship between the two locations, as the percent dimming of the fixtures changes, the light levels at both locations will change differently. The TTW algorithm defines a light delivery efficiency as the total lux delivered to a particular point divided by the lumens emitted by the fixture:

$$E = \frac{\text{Sensed } Lux}{\text{Emitted Lumens}}.$$

By using the knowledge of the difference in the light delivery translation (e.g., the non-task-to-task efficiency translation, K, or the non-task-to-task ambient translation, C), the TTW algorithm can translate how light changes at the light switch location in response to percent dimming commands to how the light will change at the task location in response to those commands.

For both non-task-to-task ambient translation and non-task-to-task efficiency translation, the key to the algorithm may be to measure light properties at both the task location and wall locations using an easy-to-use setup process. By leveraging the user interface and ambient light detection capability of smartphones, this process becomes easy and intuitive for consumers, and unlocks the significant energy savings potential of the TTW algorithm.

Opportunistic Routing in Wireless Networks

In some embodiments, system includes a gateway for a wireless network, intermediate routing nodes and end nodes. The end nodes are too far to communicate to the gateway and so have to go through the routing nodes. In practice, every node can be a routing node or end node, but for purposes of discussion routing node and end node terms are used for clarity.

Traditional routing specifically identifies a specific route and unicast sends which the packets would go through to reach their destination. Opportunistic routing employs broadcasts, and a "whoever gets it, gets it" sort of strategy to get the packets to their final destination.

Figure 15:
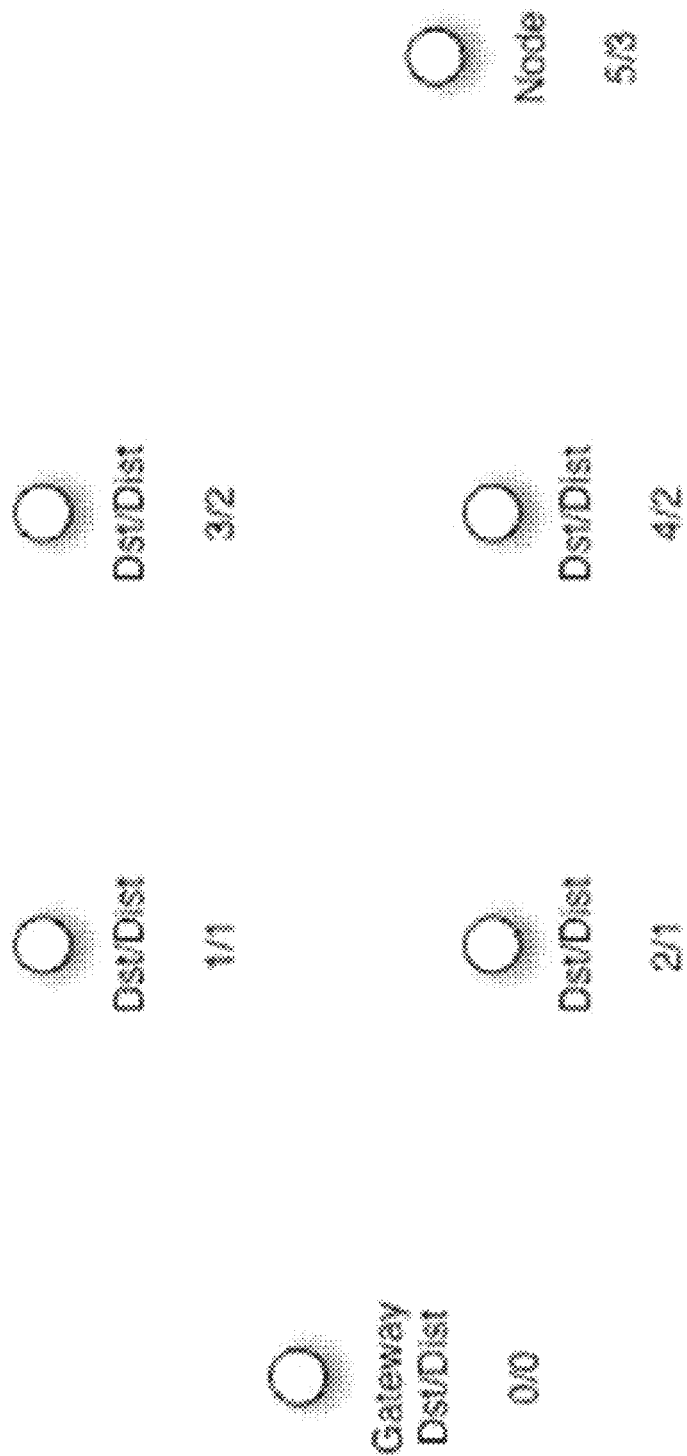
FIG. 15 shows an example network topology that has one gateway, one battery powered node, and 4 routers according to some embodiments described herein.
Figure 16:
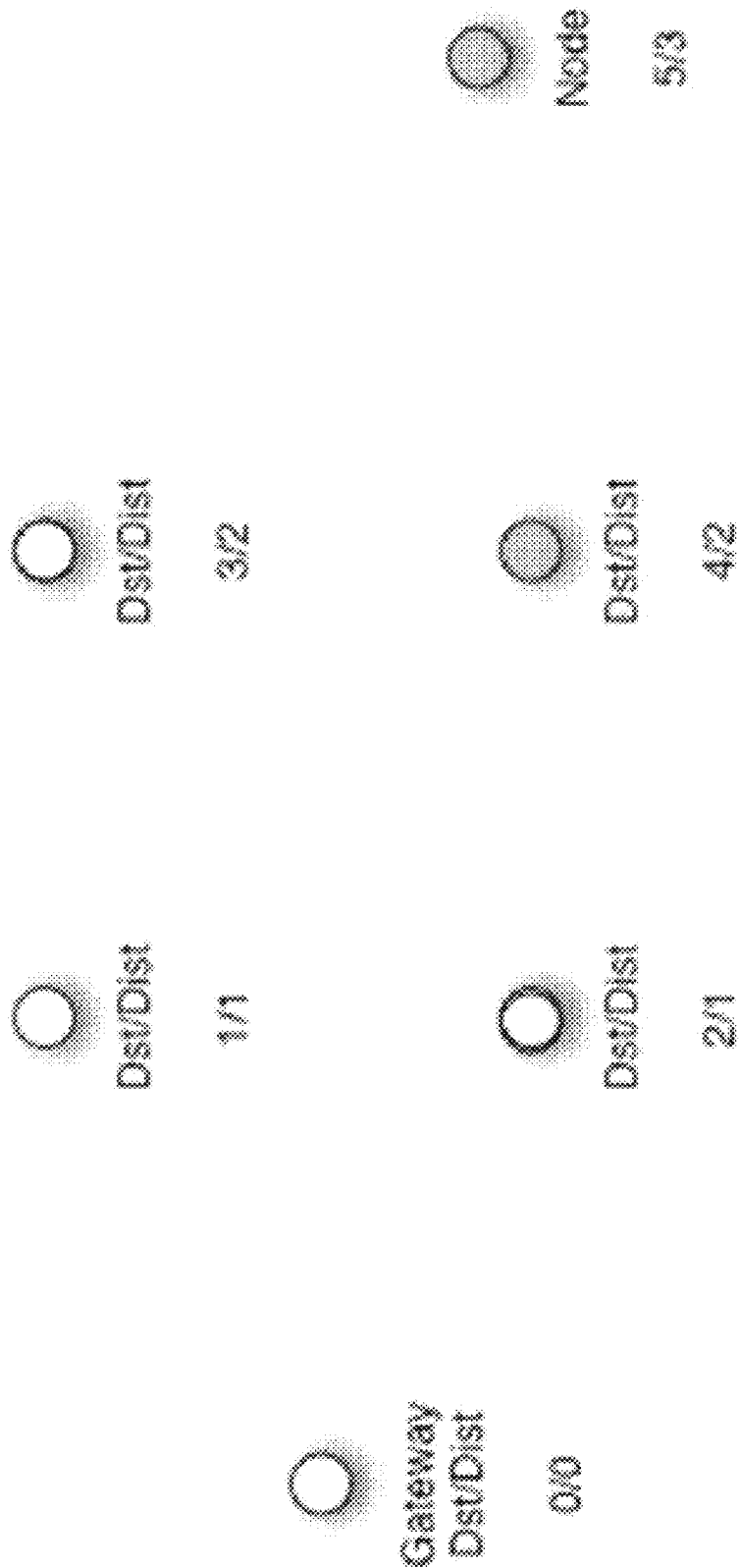
FIG. 16 shows the topology where only one intermediate router receives the message according to some embodiments described herein.

In some embodiments, every router node (including the gateway) employs Route Advertisement messages (RA), that contain a list of final destination nodes and the distance from that node to the destination. For example, the network topology shown in FIG. 15 has one gateway, one battery powered node, and 4 routers. Each node is labeled with a network address and distance from the gateway with the following notation: address/distance.

The gateway has address 0, and initiates RA messages to advertise a route to it. The intermediate routing nodes then receive these RA messages and keep track of the "distance" to the destination.

Figure 17:
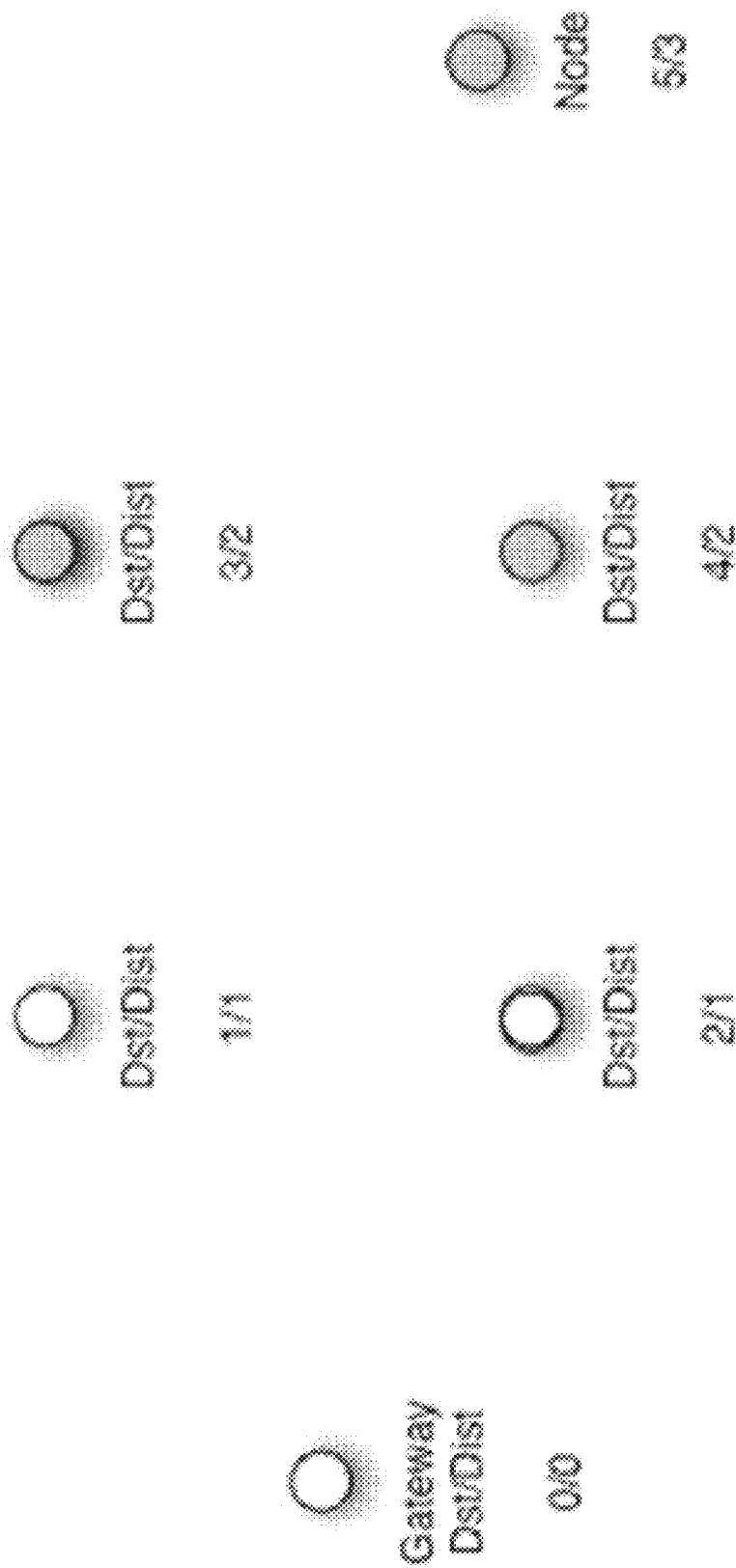
FIG. 17 shows the topology where two receive the packet according to some embodiments described herein
Figure 18:
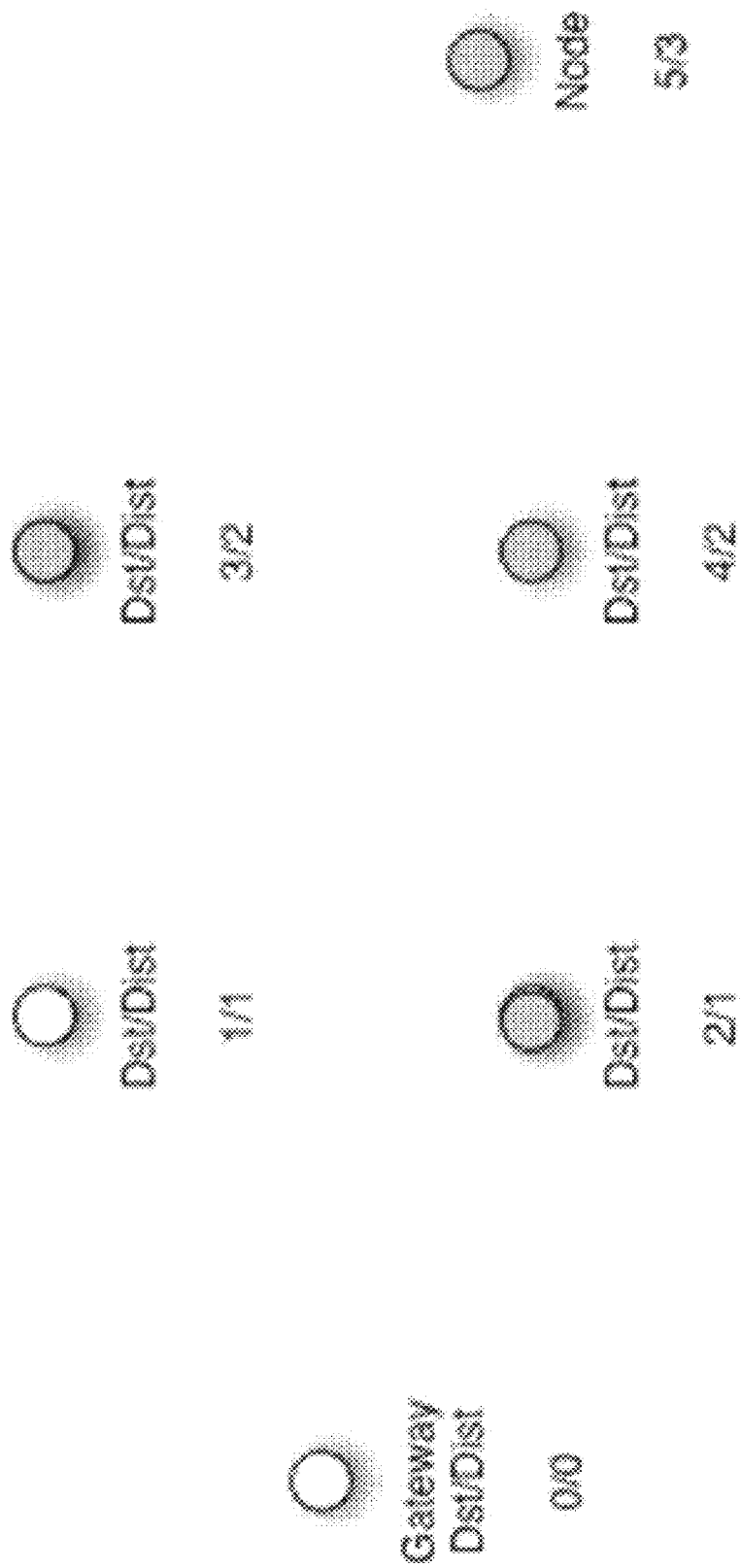
FIG. 18 shows an example topology where three router nodes receive the packet according to some embodiments described herein.

FIG. 17 shows the topology where two receive the packet. In this case, some randomness in the retransmission time and a cancellation if the same packet is heard again enable its routing without flooding the network with excessive packets:

If I'm closer to the destination than the originating packet:
    Set a random timer to resend the packet
On reception of the packet from another router node:
    Cancel the timer
On expiration of the timer:
    Retransmit the packet FIG. 18 shows an example topology where three router nodes receive the packet. In this case, the addition of a time-slotted system where slots are assigned on the basis of distance to the destination moves the packet to its destination quickly:

The random sending time still happens within each time-slot, but all the routers of 0 distance get to retransmit first, then 1 distance, then 2, etc. And, as before, the retransmission by the router at distance 1 in the diagram then cancels the retransmission by the routers at distance 2 in the diagram.

Another duplicate detection rule may include:
On packet reception:
    If I'm closer to the destination than the originating packet:
        Set a random timer to resend the packet
        Update distance to originating node
On reception of the packet from another router node:
    If I have a timer for this packet:
    Cancel the timer
    If I have already handled this packet:
        don't do anything, drop the packet.
On expiration of the timer:
    Retransmit the packet As the packets pass through the routers, they build up routes in the same way so that a return packet could reach its destination to the final node. This is often called a "reverse route" in low-power wireless systems, but in this system, it is really just the same concept used over again as the route to the gateway.

While the usual use for this system will undoubtedly be routing of packets to the gateway, and then response packets back to the node, node to node "mesh" routing is also possible with this routing scheme using the identical strategy outlined above.

If a node wishes to send a packet to an arbitrary node in the system, it could send a route discovery message that is sent via a "network flood" protocol—i.e., every node in the system receives this packet. This causes the destination node to initiate a RA message, which will then propagate through the network, and then the packet can be sent normally as described above.

There may be many benefits to this opportunistic routing system. These benefits may include the following. The system may be interference tolerant. A big problem in low power wireless networks is interference, especially systems that operate in the 2.4 GHz band shared by WiFi. This system gives each packet multiple chances to go through, and so can more effectively tolerate interference than traditional unicast routing. The system may takes advantage of "low quality" links In the examples above, say that there is a 5% chance that the node successfully sends a packet directly to the gateway. If the packet gets through, then that fact is taken advantage of, whereas in traditional routing, the packet would still go through intermediate routing nodes. The system may be simple to implement. The rules are very simple to implement, so systems with low processor power and/or memory requirements could take advantage of this system. The may not be any active coordination between routing nodes. Other opportunistic routing systems have active messaging coordination between routing nodes to do things like decide which routing node is the "best" one to forward the packet or group of packets on (ie, EXOR). Or, other protocols (ie, SOAR) try to identify a group of good candidates to send the packet to. Some embodiments do neither, it just sends the packets and re-uses the retransmission of those packets as a way to cancel un-needed redundant transmissions of the packet.

There may be redundant routes. Since multiple routers can grab packets and route them, there is redundancy in the routing paths. This not only helps interference environments, but also environments where some links might be distant and not of high quality. This is similar to 1 and 2 above, or perhaps a superset way of saying the same thing.

There may be no packet intermediate node id addition for retransmission. This opportunistic routing scheme does not modify the packet when it is retransmitted, it simply just re-sends it.

Embodiments may include a system for routing packets in a multi-hop environment where an initiating node sends a broadcast message addressed to a specific network address destination; one or more intermediate nodes receive this message and rebroadcast it if they are closer to the destination; the rebroadcast of the message itself also serves as a signal to other intermediate nodes that they do not have to rebroadcast the message; this repeats until the specific network address is reached and the data packet is delivered. The embodiment may also include the determination of "closer to the destination" is measured in the number of hops to the destination.

Lighting System with Daylight Harvester and Personal Control

Some embodiments include a lighting unit that has a daylight harvesting photo sensor, and personal control up/down buttons, both combined inside a portable personal remote. Both daylight harvesting and personal control reduce the energy usage of lighting systems. Daylight harvesting can save 20-60% depending on lighting geometry and personal control can save 5-15%.

Figure 19:
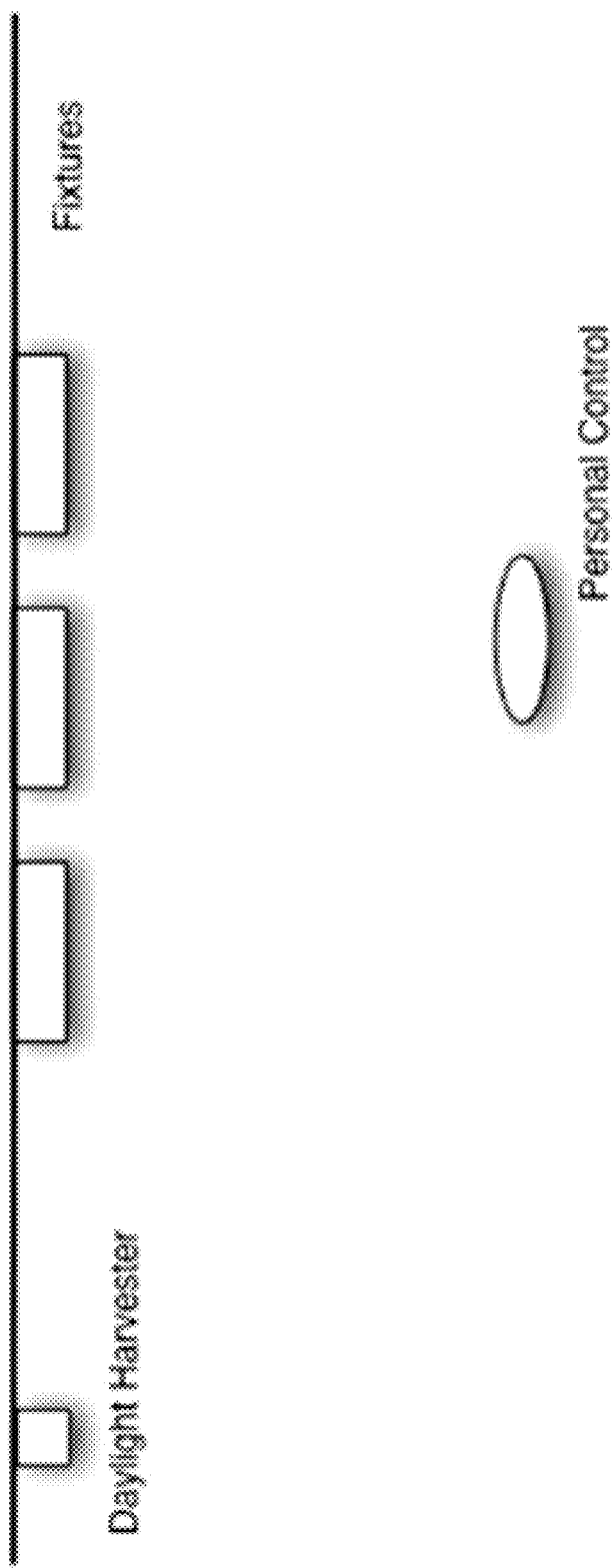
FIG. 19 shows an example daylight harvesting sensors set on the ceiling, and personal control units with lighting level controls mounted on the wall according to some embodiments described herein.

Daylight harvesting sensors are traditionally on the ceiling, and personal control units with lighting level controls have been either mounted on the wall, or in a battery powered remote as shown in FIG. 19.

Figure 20:
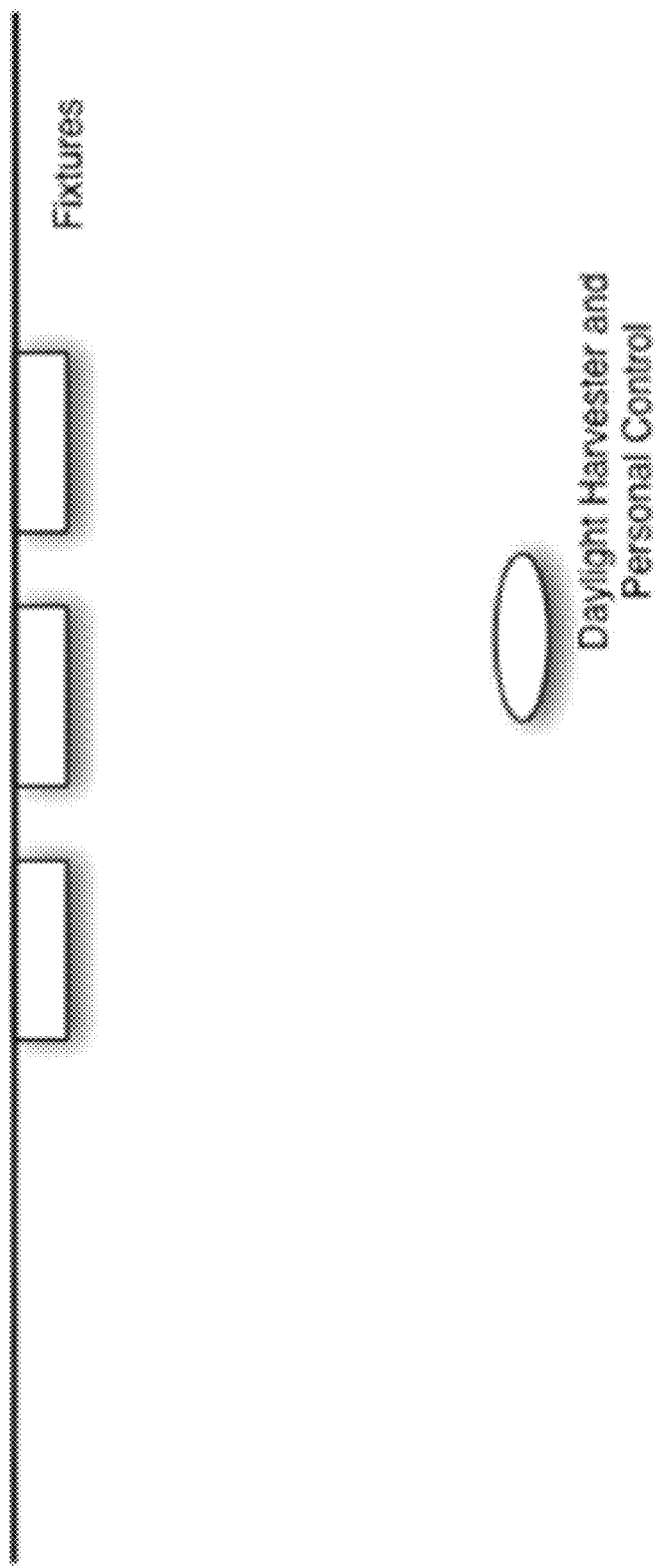
FIG. 20 shows a system where the daylight harvesting sensors and the personal control unit are combined according to some embodiments described herein.

In some embodiments, two functions can be combined into one remote or wall unit as shown in FIG. 20. Two primary arguments exist for placing daylight harvesting sensors on the ceiling: First, placing them on the ceiling enables them to sense ambient light more effectively—ie, the sensor reads ambient light and not light from lighting fixtures. And, second, reflectivity changes of objects down on the floor or task or desk won't change the daylight harvesting sensor's reading if it is on the ceiling.

However, combining the two functions into one unit overcome these objections. If the reflectivity of an object changes the sensor reading and results in too much light or too little light, a person can simply adjust the light level with the buttons. Additionally, while it is true that placing the unit at the ceiling directly measures ambient light, this system may be better since the system is controlling to the desired result which the system is directly measuring—total light at the sensor itself.

Figure 21:
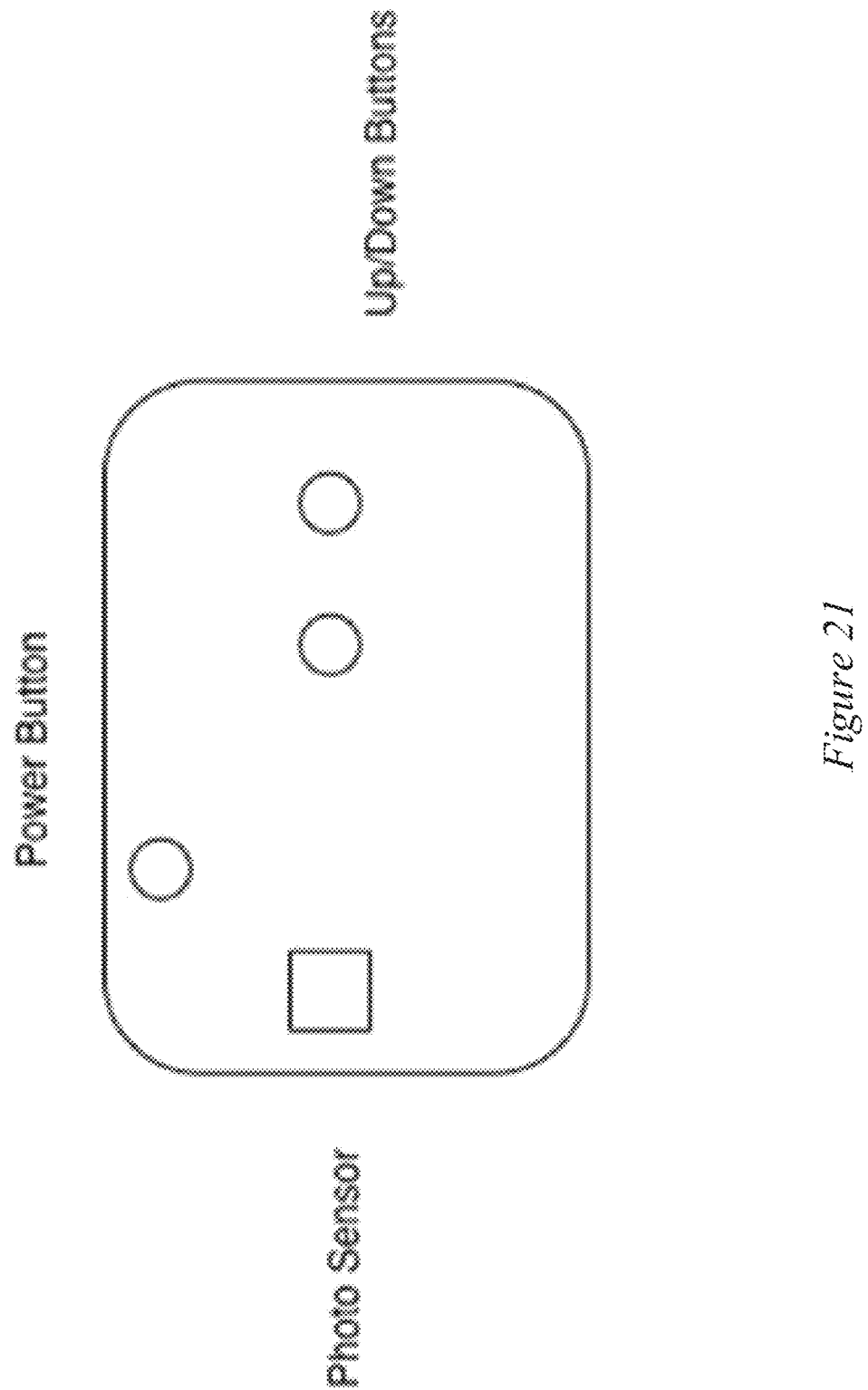
FIG. 21 shows an example block diagram of a battery powered portable remote according to some embodiments described herein.

FIG. 21 shows an example block diagram of a battery powered portable remote. The unit is a small remote control with a photo sensor, a power button and up/down buttons.

Figure 22:
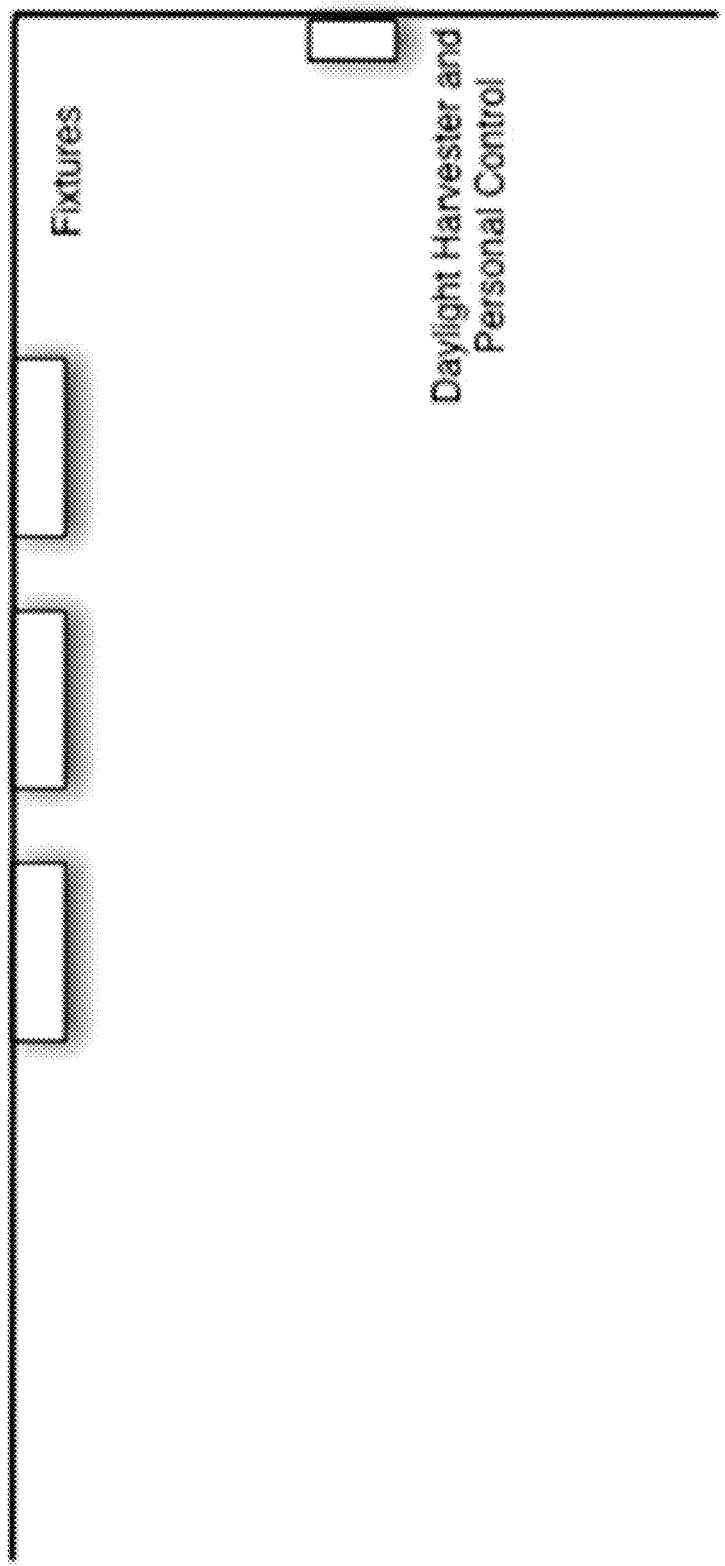
FIG. 22 shows an example block diagram of a battery powered portable remote coupled with a wall according to some embodiments described herein.

While this preferred embodiment can be placed on a task surface such as a desk or conference table, a viable alternative embodiment would be a wall mounted unit with the same features as shown in FIG. 22.

The location on the wall could be at any spot where power is conveniently routed. Existing electrical outlets or wall light switch locations are particularly advantageous locations. Retrofitting existing 1U/2U electrical wall boxes that contain outlets or light switches would be a convenient method of locating the daylight harvester and personal control unit.

Figure 23:
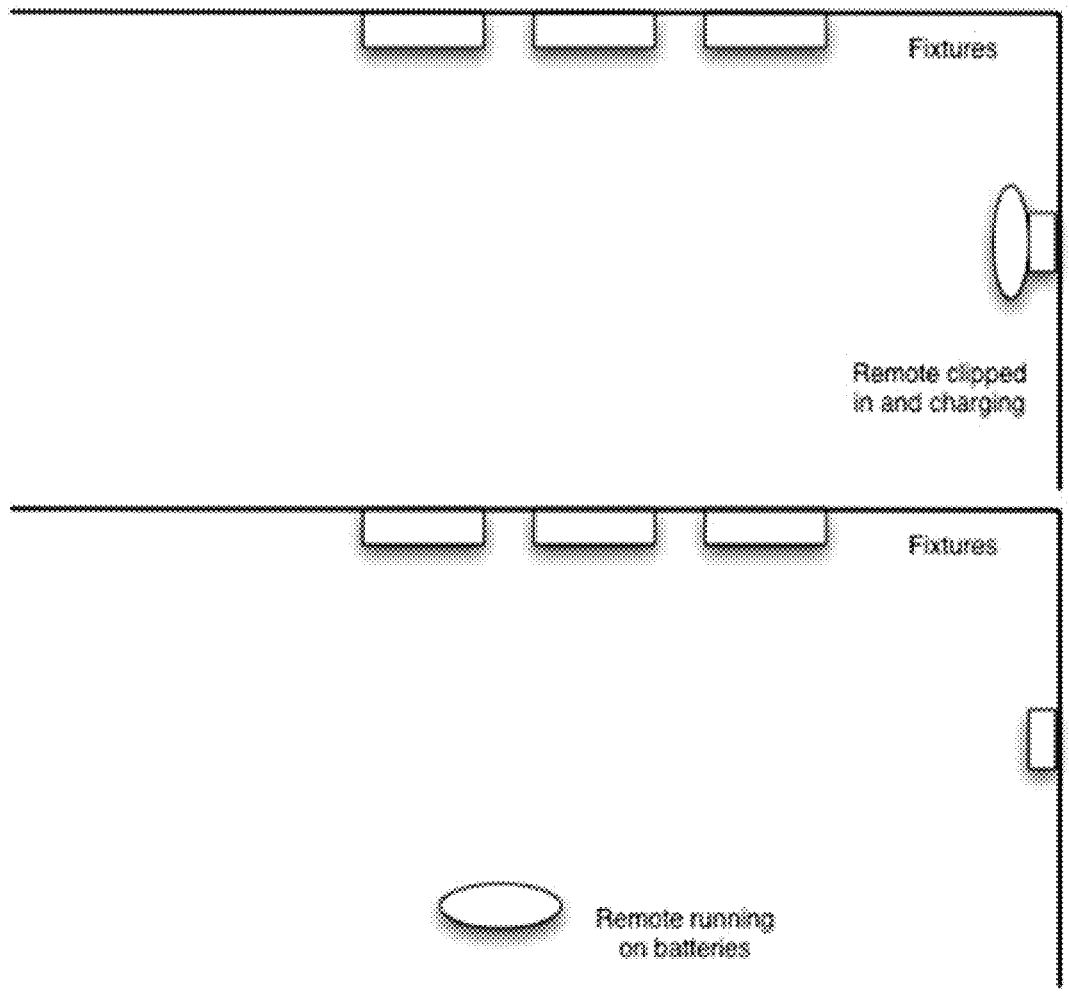
FIG. 23 shows both units described in FIGS. 21 and 22 according to some embodiments described herein.

Some embodiment may include a combination of the two as shown in FIG. 23. This configuration has a location on the wall with power as described above, but also a battery powered remote. The remote clips into the wall location and receives power to recharge the battery. While clipped in, the remote not only charges but also functions as the daylight harvester and personal control unit. Then, optionally, the remote can be unclipped and operate on batteries at any chosen location.

Of course, other embodiments may exist.

Light Association with Clip-in Wall Mounted Sensor

Some embodiments include a method for associating fixtures and sensors via light transmission. And some embodiments may keep track of the last known light delivery efficiency, even when fixtures and sensors are not currently able to transmit light between each other.

Specifically, when light sensors transmit their light information message, this message contains two pieces of information: current fixture contribution and the light delivery efficiency. In the fixture, if the fixture contribution is zero, this indicates that no light transmission is currently possible. This could be for many reasons, including the fixture not being in the room with the sensor, an obstacle temporarily being between the fixture and the sensor, or even a burst of optical noise occurring.

Because of this, the fixtures track their current light delivery efficiency, and the last known good light delivery efficiency ("Last E") for each sensor. When no current light delivery efficiency information exists for any sensors, the fixtures use the Last E information instead. Fixtures can then use the Last E information to accomplish intelligent lighting control.

When operating with the Clip-In Wall Mounted Sensor configuration described above, this "Last E" behavior is particularly advantageous. A potential problem with the LED some systems without the "Last E" behavior is ensuring that the lights always can communicate over light with the sensor. Depending on the sensor placement, this is not always possible.

Figure 24:
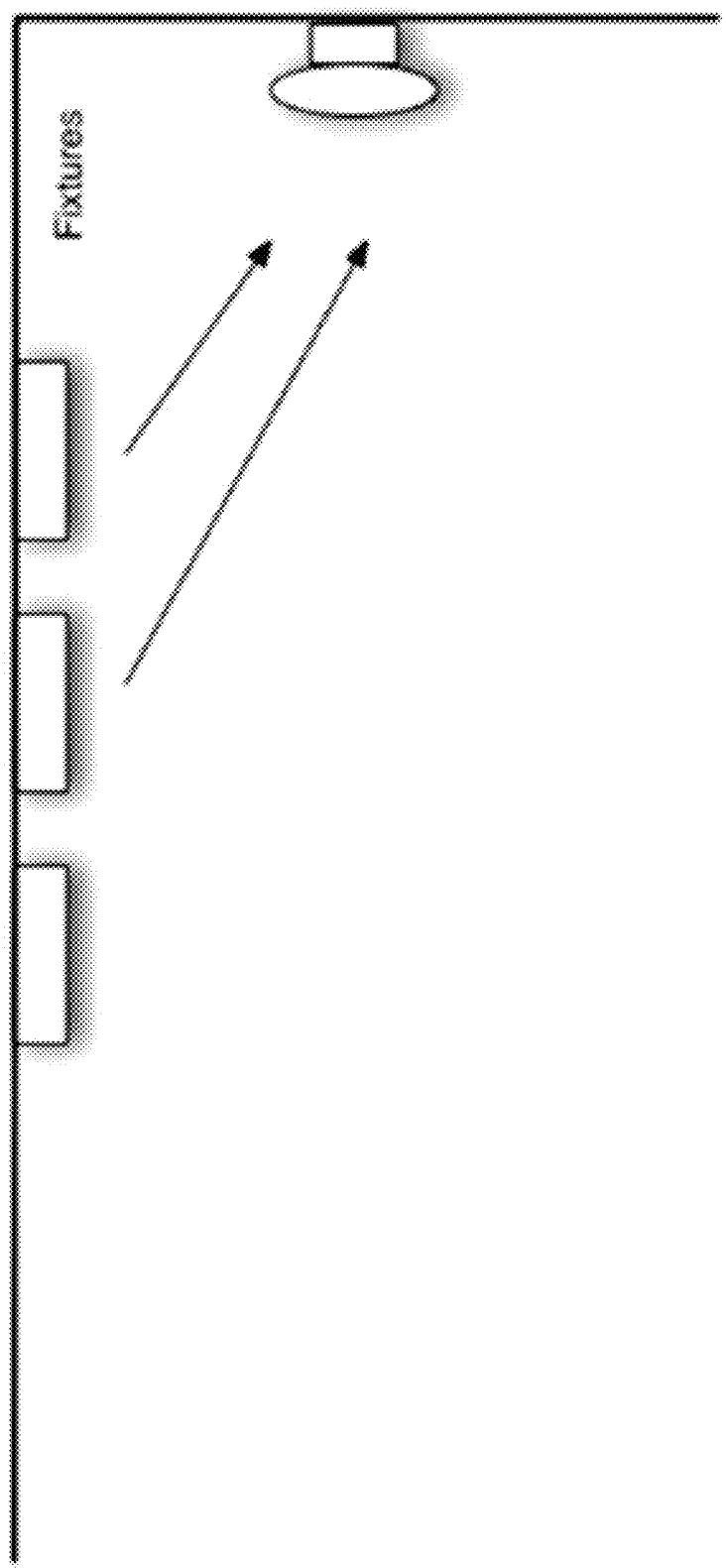
FIG. 24 shows an example Clip-In Wall Mounted sensor according to some embodiments described herein.

The "Last E" behavior allows lights that would not ordinarily be able to associate and be controlled with a sensor to still be able to participate with that sensor. The combination of this behavior is particularly powerful when combined with the Clip-In Wall Mounted sensor configuration above as illustrated in FIG. 24.

Figure 25:
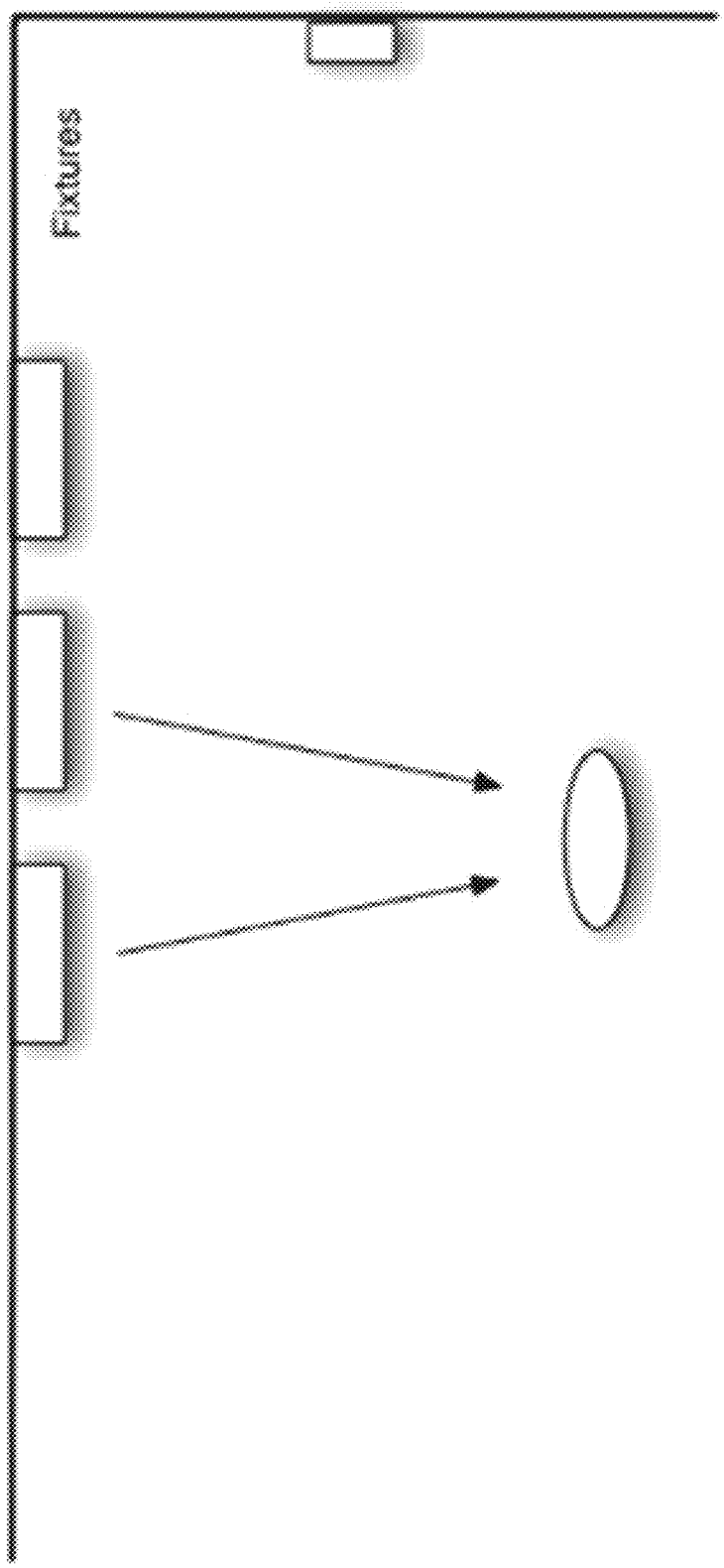
FIG. 25 shows a portable sensor that may be moved closer to one of the fixtures according to some embodiments described herein.

In this situation, two of the three fixtures can communicate with the sensor over light, but the third is too far to communicate over light. Since the sensor is portable, it could be initially moved to be able get close enough to the third fixture as shown in FIG. 25.

Figure 26:
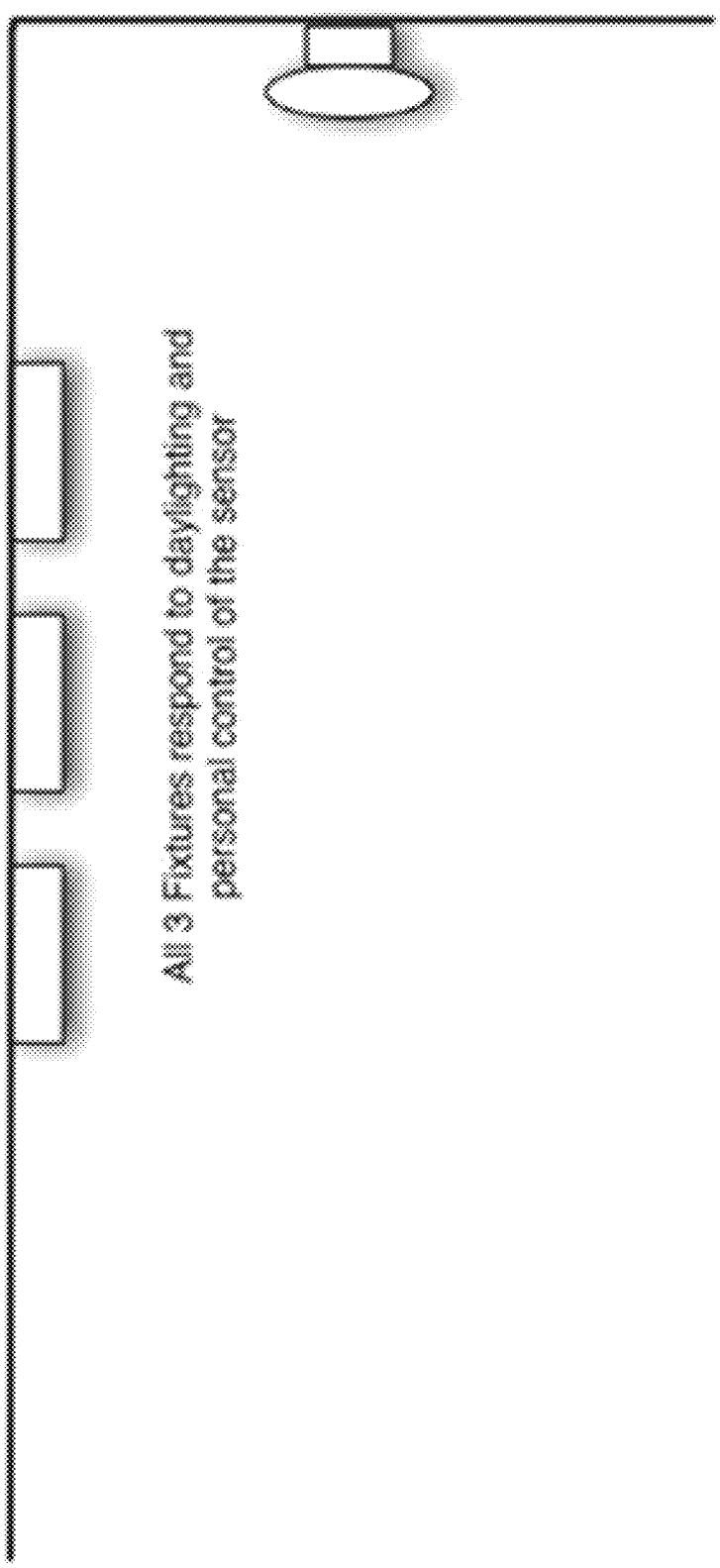
FIG. 26 shows how the fixtures may still dim and respond to the personal control of the remote according to some embodiments described herein.

Then, if the sensor is moved back, the third fixture will still dim and respond to the personal control of the remote, even though it cannot communicate with it directly as shown in FIG. 26.

The combination of daylight harvesting and personal control in the same unit has the following unexpected benefits. In a battery powered implementation, the light measured for daylighting control is at the exact point where you care about it, ie, where you are, and you have direct control over that level. In a wall mounted implementation, easy control via the up/down buttons for the daylighting control allows people to change the light level conveniently. In both implementations, since the daylighting and personal control are in the same unit, no association step is needed.

The up/down buttons control exactly what you want: the light level at the location in the unit.

Some embodiments may measures the total light with the daylight harvesting photosensor. Traditional daylight harvesting sensors measure ambient light, which is just an intermediate step. What people ultimately care about is that their overall light level is appropriate.

In the wall clip-in recharging application above, the optional battery-powered operation of the unit combined with the "Last E" behavior of the system may enable difficult-to-handle light communication situations to be handled simply. Said another way, fixtures could "auto-associate" or "auto-commission" with the sensor and then participate in control in situations where they would otherwise not be able to.

Some embodiments include a lighting system which includes a control unit with personal control elements and a daylight harvesting element.

Some embodiments include a lighting system which includes a control unit with personal control elements and a daylight harvesting element wherein the control unit is a remote control that is powered from the wall.

Some embodiments include a lighting system which includes a control unit with personal control elements and a daylight harvesting element wherein the control unit is a remote control that is mobile and battery powered.

Some embodiments include a remote that clip into a wall mounted electrical connection for re-charging.

Some embodiments include a lighting system that also includes an occupancy sensor in the same unit.

Some embodiments include a lighting system that can auto-associate with an occupancy sensor in a different unit.

Some embodiments include a lighting system where "Last E" information is used to maintain fixture/sensor associations even when no current direct light communication path exists.

Smart Occupancy Sensors

Embodiments described herein include a smart occupancy sensor that includes an occupancy detection system that controls lighting.

Some embodiments may include a field-of-view constrained linear array of visible light sensors that both count occupants and track the motion of occupants. And, while both methods may be error prone, the weaknesses of each individual method are compensated by using the other method.

For example, imagine two linear array sensors, one watching a doorway and another with a field of view for the room. Say that the counting sensor miscounts an entrance of a person in the room. The motion detecting sensor will still detect motion in the room, compensating for the error.

Or, alternatively, imagine that someone enters a room, and then sits down to start reading. The motion detector sensor will lose the person when they sit still, but the count estimation from the counting sensor may still result in good occupancy detection.

From this overall concept, a camera-based occupancy sensor has been developed that could detect motion. A cell phone camera approach for the physical sensor can be used, but the array of light sensors described above could also be used.

Then, this camera-based motion sensor can be extended to include counting functions. Some embodiments combine motion detection with exit detection.

A smart occupancy sensor may be divided up into a number of layers:
1. Physical layer.
2. Zone light sensing
3. Zone hit detection
4. Motion detection
5. Person tracking
6. Exit detection
7. Occupancy estimation The physical layer may have two options: an array of simple light sensors, and a low cost cell phone camera. In some embodiments, a cell phone camera such as, for example, a smart phone with a light sensor or a camera can be used.

For the cell phone camera physical layer, the image is divided up into a number of vertical stripes, which may be called "zones". For the array of light sensors, this is same zone division would happen, but by means of a mechanical piece that would limit the field of view of each individual sensor to a vertical stripe.

In the cell phone camera case, this division may occur in software. Currently an image is divided up into 16 zones of 10 pixels in width each by 120 pixels high. In each zone, for each frame captured, a total intensity is calculated:

```
total = 0
for each pixel in zone
    total += pixel Intensity
```

It may be advantageous to total up not only the total intensity, but to use the spectral information from the camera as well. The current preferred embodiment only totals the red component of the image

```
total = 0
for each pixel in zone
    total += pixel intensity in Red only
```

This software approach for the cell phone camera implementation is similar to the hardware approach of using a linear array of light sensors with a mechanical "shade" that limits the field of view of each sensor to the same vertical stripe of the image.

For each zone, a low pass filtered running average is calculated. This is done with a simple single pole IIR filter:

$$average = (0.5*total) + (0.5*average)$$

This the difference between the instantaneous total and the average is calculated, (called a "delta"):

$$delta = abs(total - average)$$

This delta then may be compared to a threshold, and if it exceeds this threshold, that is called a "hit":

```
thresh = average * 0.02
if (delta > thresh)
    hit = 1
else
    hit = 0
end
```

The motion detection algorithm then may be very simple:

```
motion = false
for each zone
    if hit in zone == 1
        motion = true
    end if
end for
```

This algorithm looks for any hits in any of the zones, and if any are present, that is motion.

The motion tracking layer may look at the maximum delta (calculated above in 3), and creates an estimate of the zone with the most motion given the maximum delta:

```
maxDelta = 0
for each zone
    if delta in zone > maxDelta
        maxDeltaZone = this zone
    end if
end for
```

This maximum delta information is then gated with the hit detection to create a time series of motion tracking estimates:

```
nextEstimate = -1 if
hits in any zones
    nextEstimate = maxDelta
end if
``` prepend nextEstimate to estimates

Where 1 indicates that no motion occurred during that time and estimates is an array of a time series of the estimate data The exit detection layer may look at the estimate array from Layer 6 to estimate whether a person existed the field of view of the camera. The indices on the estimates array indicate time position, with 0 being the most recent. The zones are numbered 0 to 15, and so comparisons with the zone number of >12 means that the motion position estimate is on the edge of the frame (13, 14 or 15). Of course detection on the other edge is also possible.

```
if ( (estimates [0] == -1) && (estimates [1] == -1) )
    if ( (estimates [2] > 12) 11 (estimates [3] > 12) 11
        (estimates[4] > 12) )
        isExit = true
    else
        isExit = false
    end if
else
    isExit = false
end if
```

The logic behind this is: if there is no motion now (estimates[0]—-1) && (estimates[1]—1), and there was recently motion at the edge of the frame (the next if), then there should have been an exit.

Occupancy Assessment

Finally, the last layer uses the previous information to assess whether there is occupancy in the room that the sensor is looking at. First, if there are currently any hits, that is occupancy:

```
if (anyHits == true)
    occupancy = true
end
```

Then, if there are not currently any hits and there was an exit, then that means there is no occupancy:

```
if (occupancy == true)
    if (isExit == true)
        occupancy = false
    end
end
```

It may be helpful to note that the occupancy state does not change if either of these two ifs are not satisfied.

The end result of these simple rules is significant: this algorithm can detect motion like traditional occupancy sensors, but the exit detection allows the sensor to solve a nettlesome problem of traditional occupancy sensors. Most sensors falsely think there is no occupancy in a room when someone walks into a room and then sits still when they are reading, working on a computer, etc.

This smart occupancy approach solves this problem. It maintains the occupancy state until an exit is detected, so the lights do not go off while a person is quietly reading or working.

This occupancy strategy works well for rooms with one person typically entering or exiting such as a bedroom or office. This motion+exit detection strategy wouldn't work as well for multi-occupant rooms such as conference rooms or dining areas.

While this description is of the current preferred embodiment of each of these layers, other embodiments are possible. In particular, as noted above, the combination of motion with counting occupancy estimation could handle more difficult occupancy assessment situations such as a conference room or dining area where multiple people come and go from a room over time.

There are multiple possible benefits to this occupancy detection system. Low cost. PIR and camera sensors are expensive, while visible light sensors and cell phone cameras are very low cost. Robust occupancy detection. Motion+Exit Detection handles single-occupant rooms effectively. Counting+Exit Detection could handle multi-occupant rooms effectively.

Existing camera based motion detectors or counting detectors require sophisticated video processing with lots of CPU processing and RAM, while this system uses simple algorithms. In particular, this system does not require the storage of entire video frame buffers which require much RAM. RAM is expensive in microcontrollers, so this would result in low system cost.

Occupancy detectors have never really done a very effective job of robustly and inexpensively detecting occupancy. Passive Infrared Sensors (PIR) detect temperature by looking at infrared light and have flaws discussed above. Changes in temperature are inferred to imply motion by a processor. Embodiments described herein can be different: visible light, not PIR and dual-mode. Visible counting detectors use a two light beams with detectors are a door entrance and look at the detectors to detect direction of travel. A light sensor can be used to increase reliability and passively use visible light instead of active emitters. Also, embodiments described herein add the motion detection aspect, and then the combination of count+motion to determine overall occupancy estimation.

Multiple Sensor Proximity Determination and Auto-Association

Figure 27:
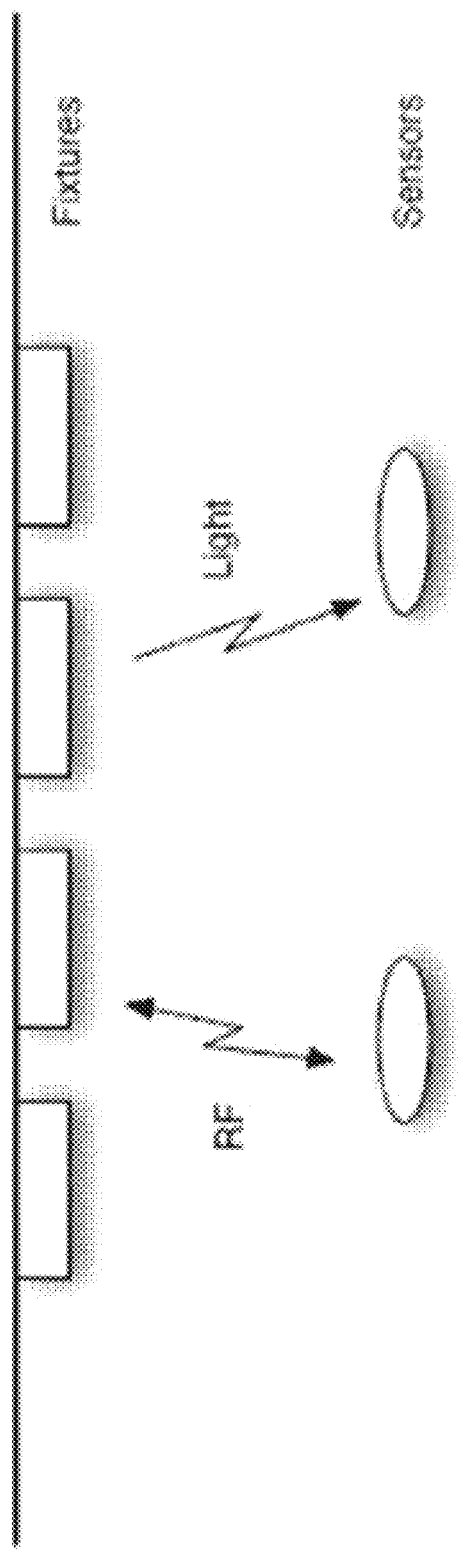
FIG. 27 is an example architectural space with multiple fixtures and multiple sensors according to some embodiments described herein.

FIG. 27 is an example architectural space with multiple fixtures and multiple sensors according to some embodiments described herein. Embodiments described herein include multiple sensors that can determine whether they are close to one another and how close.

A sensor may include any device located within the architectural space. A specific example of another type of device is an occupancy sensor that can tell whether people are located in the general vicinity. A problem in a wireless LED lighting system is how to locate occupancy sensors and associate them with lights so that lights can dim or turn off when people aren't there so that energy and money can be saved.

Figure 28:
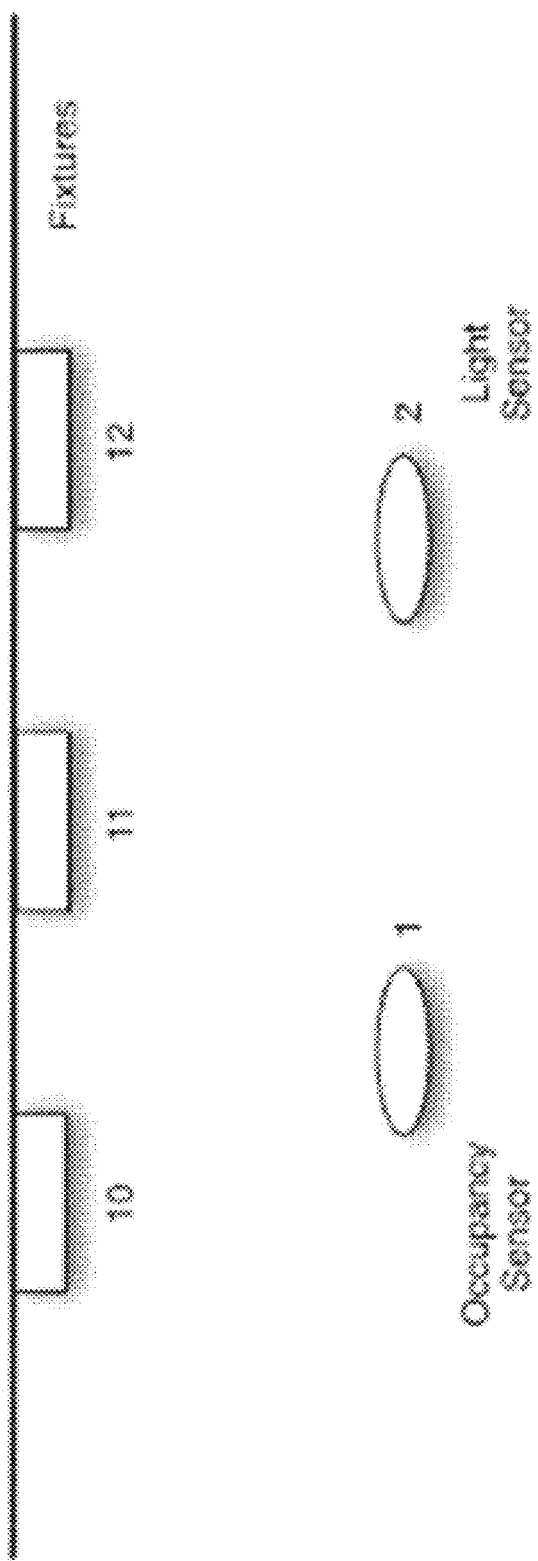
FIG. 28 is an example architectural space with multiple fixtures and multiple sensors according to some embodiments described herein.

The ability to send a code over light and for sensors to determine fixture contributions from that light is the kernel from which this auto-commissioning process derives. This information allows sensors to not only determine what lights are in the same room by the reception of the ID, but also determine how close fixtures are. FIG. 28 is an example architectural space with multiple fixtures and multiple sensors according to some embodiments described herein. The sensors create a table of this information as they query fixtures. For example, sensor 1 in the above diagram might have this table:

| Fixture ID | Fixture Contribution | Light Delivery Efficiency |
|---|---|---|
| 10 | 40 1x | 0.2 |
| 11 | 20 1x | 0.1 |
| 12 | 0 1x | 0 |

And sensor 2 might have this table:

| Fixture ID | Fixture Contribution | Light Delivery Efficiency |
|---|---|---|
| 10 | 0 1x | 0 |
| 11 | 0 1x | 0 |
| 12 | 20 1x | 0.2 |

By comparing tables, the two sensors can determine that they are not close to one another optically. They do not have any fixtures in common whose light they can see. In the general case, these two sensors which could be embedded in an arbitrary device could then know that they should not associate with one another.

Specifically, if one of the sensors was embedded in an occupancy sensor, the other sensor would then know to ignore the occupancy state indication from that sensor. In this case, it is likely that the occupancy sensor and the light sensor are in different rooms.

In contrast, if the two tables were different:

| Fixture ID | FC | E |
|---|---|---|
| Sensor 1 (occupancy) | | |
| 10 | 0 | 0 |
| 11 | 20 1x | 0.2 |
| 12 | 40 1x | 0.3 |
| Sensor 2 (light) | | |
| 10 | 20 1x | 0.1 |
| 11 | 20 1x | 0.2 |
| 12 | 0 | 0 |

Sensor #2 could compare its table to sensor #1, and see that not only does Sensor #1 also receive light from fixture 11, but they also have comparable light delivery efficiencies. If Sensor #1 were embedded into an occupancy sensor, Sensor #2 could use the occupancy information from Sensor #1 to modify its light set point to save energy when people aren't in the room.

Specific Method for Occupancy Sensor Location

Using the general method outlined above for determining the proximity of arbitrary devices to one another, a specific method for auto-associating occupancy sensors with light sensors that control light fixtures is disclosed.

The following discussion will assume that an occupancy sensor does not also control light fixtures as a light sensor does, but the two functions can also be combined into one unit where the occupancy sensor also acts as a light sensor to control the light fixtures.

Figure 29:
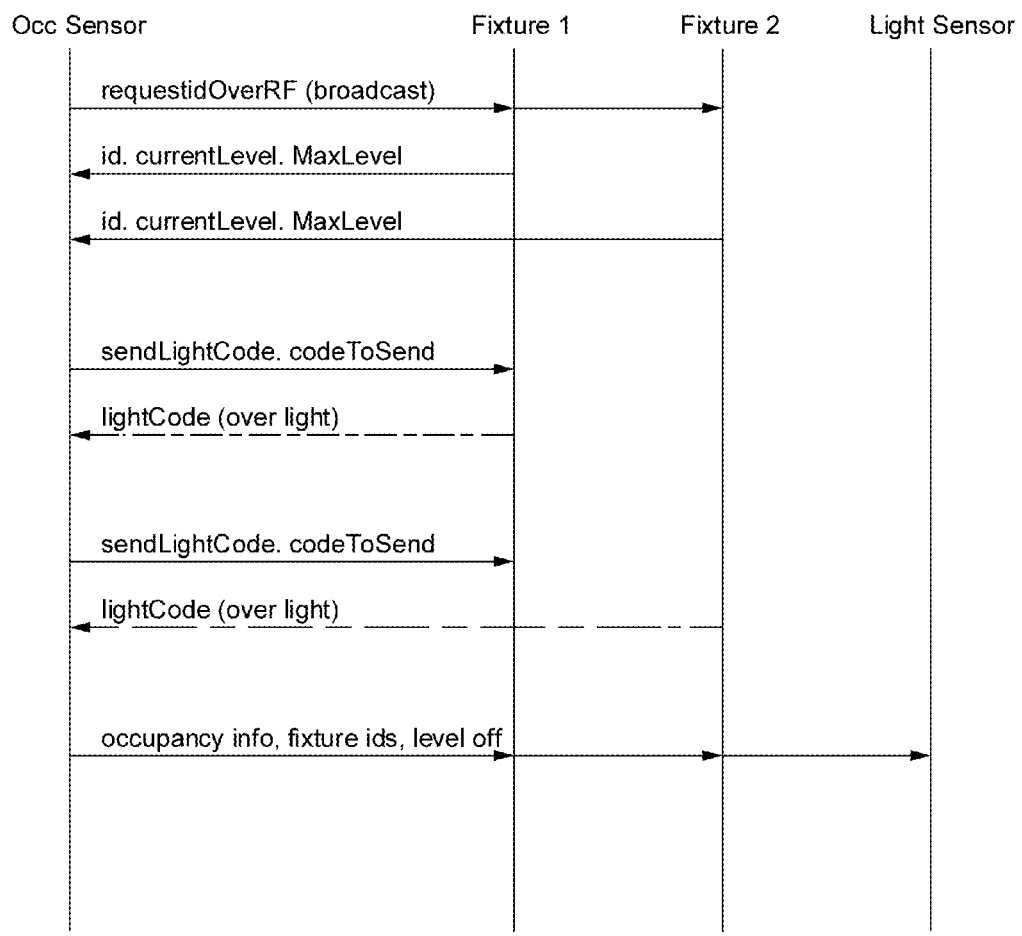
FIG. 29 illustrates an occupancy sensor that broadcasts an occupancy info message over RF according to some embodiments described herein.

The Occupancy sensor has some sort of sensor that can tell whether people are in the room such as passive infrared, ultrasonic, camera, etc. Additionally, the Occupancy sensor has a light sensor and processor capable of demodulating the optical bursts that are sent by the fixtures. The Occupancy sensor then acts in much the same way as a normal LED light sensor, except that it also broadcasts an Occupancy Info message (OI) over RF that then indicates the state of the occupancy estimation, as well as the same fixture list that is contained in the LED Light Info message (LI) as shown in FIG. 29.

When the Light Sensor receives this Occupancy Info message, it then can compare its table of fixture information to the table contained in the OI message, and use this comparison to make an intelligent decision on how to change a light level control based on whether there are people in the room. This comparison is explained above.

Given the occupancy info from the OI message, light sensors can use this information to modify light control set points. Many algorithms are possible, but in the current implementation, light sensors have two set points: high and low. When light sensors receive OI messages indicating occupancy of people, the high set point is used for light control; otherwise the low light set point is used.

Figure 30:
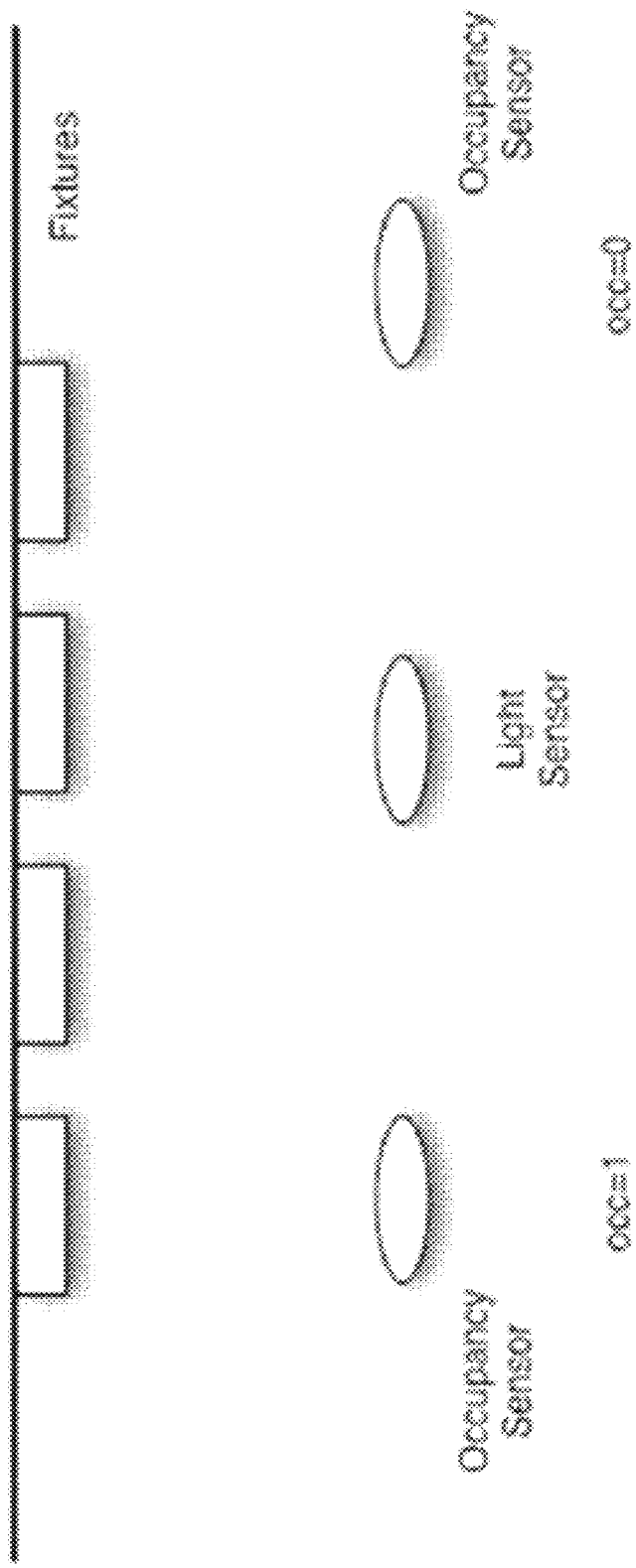
FIG. 30 illustrates an example when there are multiple occupancy sensors providing occupancy info messages according to some embodiments described herein.

When there are multiple occupancy sensors providing Occupancy Info messages, the Light Sensors need to decide how to combine potentially conflicting information to decide how to control light levels and how to avoid oscillations. For example, the arrangement shown in FIG. 30 may provide conflicting information to the light sensor.

In some embodiments, the Light Sensor uses the following algorithm to decide what light level to use:

```
if any occ's have fixtures in common, then
    use high control level
else
    use low control level
```

However, many other algorithms are possible and other algorithms can be constructed by one skilled in the art.

This same situation can potentially lead to oscillations in the light control level. The light sensors solve this problem by collecting up OI messages over a period of time, and then making one decision using all the occupancy information together. Currently this is done at the time when a send light info message happens, but of course other time frames are possible.

One problem that can emerge with the occupancy sensor algorithm described above is that when the occupancy sensor detects that people are not present, it triggers a transition of the lights from a high light state to a low light state. This can be interpreted by occupancy sensors as motion and cause the lights to immediately go back to a high state. The light sensors currently solve this problem by ignoring occupancy state information for a number of seconds after this high-to-low light level change.

An alternative way to distribute occupancy information to sensors is through the light fixtures. The light fixtures can collect up OI messages and note the OI information for its fixture, and then include Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

That which is claimed is:

1. A method for measuring the ambient task light level, the method comprising:
    measuring a first ambient light level at a first location within an architectural space at a first time;
    measuring a second ambient light level at a second location within the architectural space at a time near the first time, wherein the first location is different than the second location;
    determining a non-task-to-task efficiency translation from the first ambient light level and the second ambient light level;
    determining a third ambient light level at the second location at a second time, wherein the second time is different than the first time; and
    determining a light adjustment value for illuminating the first location from the third ambient light level and the non-task-to-task efficiency translation, wherein determining the light adjustment value is determined from:

$$L_{adjustment} = L_{desired\ at\ first\ location} - KL_{second\ location},$$

where $L_{adjustment}$ is the light adjustment value, $L_{desired\ at\ first\ location}$ is the desired light amount at the first location, K is the non-task-to-task efficiency translation, and $L_{second\ location}$ is the second ambient light level at the second location.

2. The method according to claim 1, wherein the non-task-to-task ambient translation comprises a constant.

3. The method according to claim 1, wherein the non-task-to-task ambient translation comprises a table having a plurality of constants.

4. The method according to claim 1, wherein the determining a third ambient light level at the second location at a second time further comprises:

measuring a total light level at the second location;
determining the light contribution of one or more light fixtures to the light level at the second location; and
determining the third ambient light level from the total light level and the light contribution of the one or more light fixtures.

5. The method according to claim 1, wherein the non-task-to-task ambient translation is the ratio of the first ambient light level at the first location and the second ambient light level at the second location.

6. The method according to claim 1, wherein the first ambient light level is measured at a first location using a smart phone.

7. A light sensor comprising:
a photo sensor;
a memory; and
a controller coupled with the photo sensor and the memory, wherein the controller is configured to:
measure a first ambient light level using the photo sensor at a task location within an architectural space at a first time;
measure a second ambient light level using the photo sensor at a non-task location within the architectural space at a time near the first time, wherein the task location is different than the non-task location;
determine a non-task-to-task efficiency translation from the first ambient light level and the second ambient light level;
store the non-task-to-task efficiency translation in the memory;
measure a total light level using the photo sensor at the non-task location within the architectural space at a second time, wherein the second time is different than the first time;
determine a third ambient light level at the non-task location using the total light level; and
determine a light adjustment value for illuminating the first location from the third ambient light level and the non-task-to-task efficiency translation, wherein determining the light adjustment value is determined from:

$$L_{adjustment} = L_{desired\ at\ first\ location} - KL_{second\ location},$$

where $L_{adjustment}$ is the light adjustment value, $L_{desired\ at\ first\ location}$ is the desired light amount at the first location, K is the non-task-to-task efficiency translation, and $L_{second\ location}$ is the second ambient light level at the second location.

8. The light sensor according to claim 7, wherein the non-task-to-task ambient translation comprises a table having a plurality of constants.

9. The light sensor according to claim 7, wherein the controller is further configured to determine the light contribution of one or more light fixtures to the light level at the non-task location; and wherein the third ambient light level is determined from the total light level and the light contribution of the one or more light fixtures.

10. The light sensor according to claim 7, wherein the non-task-to-task ambient translation is the ratio of the first ambient light level at the first location and the second ambient light level at the second location.

11. A method for determining the ambient light level at a task location, the method comprising:
measuring a total light level at a non-task location;
determining an ambient light level at the non-task location from the total light level at the non-task location; and
determining an ambient light level at the task location from the ambient light level at the non-task location, determining a light adjustment value for illuminating the non-task location from the ambient light level at the task location and the non-task-to-task efficiency translation, wherein determining the light adjustment value is determined from: $L_{adjustment} = L_{desired\ at\ first\ location} - KL_{second\ location}$, where $L_{adjustment}$ is the light adjustment value, $L_{desired\ at\ first\ location}$ is the desired light amount at the non-task location, K is the non-task-to-task efficiency translation, and $L_{second\ location}$ is the ambient light level at the location.

12. The method according to claim 11, wherein the ambient light level at the non-task location is determined using a ratio of a previously measured ambient light level at the task location and a previously measured total light level at the non-task location.

13. A method for determining a light adjustment value for a light source, the method comprising:
measuring a first light level at a task location;
determining a first light delivery efficiency at the task location from the first light level;
measuring a second light level at a non-task location determining a second light delivery efficiency at the non-task location from the second light level at a time near the first time, wherein the task location is different than the non-task location;
determining a non-task-to-task efficiency translation from the first light delivery efficiency and the second light delivery efficiency;
measuring a third light level at the non-task location; and
determining a light adjustment value for illuminating the task location from the third light level and the non-task-to-task efficiency translation, wherein determining the light adjustment value is determined from:

$$L_{adjustment} = L_{desired\ at\ task} - KL_{non-task,2}$$

where $L_{adjustment}$ is the light adjustment value, $L_{desired\ at\ task}$ is the desired ht amount at the task location, K is the non-task-to-task efficiency translation, and $L_{non-task}$ is an ambient light level at the non-task location.

14. The method according to claim 13, wherein the non-task-to-task efficiency translation comprises a table having a plurality of constants.

15. The method according to claim 13, further comprising sending the light adjustment value to a light source.

16. A method comprising:
measuring a first total light level at a non-task location;
storing the first total light level in a memory;
measuring a second total light level at the non-task location;
storing the second total light level in the memory; and
in the event the second total light level is different than the first total light level, determining a light adjustment value for a task location from the second total light level, wherein the light adjustment value is determined from: $L_{adjustment} = -E_{task,2}\ C - \Delta L_{non-task,2}$, wherein $L_{adjustment}$ is the light adjustment value for the task location, $E_{task,2}$ is the light delivery efficiency of a light fixture at the task location, C is a non-task-to-task ambient translation, and $\Delta L_{non-taste,2}$ is the difference between the first total light level and the second total light level.

* * * * *